US011825387B2

(12) United States Patent
Raghavan et al.

(10) Patent No.: US 11,825,387 B2
(45) Date of Patent: Nov. 21, 2023

(54) SWITCHING TECHNIQUES FOR MESSAGE FORWARDING IN WIRELESS COMMUNICATIONS

(71) Applicant: QUALCOMM Incorporated, San Diego, CA (US)

(72) Inventors: Vasanthan Raghavan, West Windsor Township, NJ (US); Jung Ho Ryu, Fort Lee, NJ (US); Junyi Li, Chester, NJ (US); Tianyang Bai, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 255 days.

(21) Appl. No.: 17/120,554

(22) Filed: Dec. 14, 2020

(65) Prior Publication Data

US 2021/0204098 A1    Jul. 1, 2021

Related U.S. Application Data

(60) Provisional application No. 62/956,165, filed on Dec. 31, 2019.

(51) Int. Cl.
*H04W 4/06* (2009.01)
*H04L 1/00* (2006.01)
*H04B 7/0417* (2017.01)
*H04B 7/06* (2006.01)

(52) U.S. Cl.
CPC .......... *H04W 4/06* (2013.01); *H04B 7/0417* (2013.01); *H04B 7/0617* (2013.01); *H04L 1/0026* (2013.01)

(58) Field of Classification Search
CPC ...... H04W 4/06; H04W 88/04; H04B 7/0417; H04B 7/0617; H04B 7/15557; H04L 1/0026; H04L 1/0041; H04L 1/0045; H04L 2001/0097
See application file for complete search history.

(56) References Cited

U.S. PATENT DOCUMENTS

| 9,615,354 | B2 * | 4/2017 | Hooli | H04W 48/08 |
| 11,576,145 | B2 * | 2/2023 | Raghavan | H04L 27/364 |
| 2007/0086512 | A1 * | 4/2007 | Can | H04L 25/247 375/148 |
| 2010/0035541 | A1 * | 2/2010 | Kim | H04B 7/2606 455/9 |

(Continued)

OTHER PUBLICATIONS

International Search Report and Written Opinion—PCT/US2020/065059—ISA/EPO—dated Mar. 24, 2021.

*Primary Examiner* — Habte Mered
(74) *Attorney, Agent, or Firm* — Holland & Hart LLP

(57) ABSTRACT

Methods, systems, and devices for wireless communications are described. A device in communications with a second device may receive a message from the second device. After receiving, the device selects between a decode-and-forward (DF) or an amplify-and-forward (AF) transmission scheme for forwarding the message to a base station. The selection may be made using one or more trigger conditions associated with the transmitting device, the receiving device, or the base station, such as power availability at the device, processing capability of the device, or beam parameters such as beam width, array gain, or other conditions. After selecting, the device may use the selected transmission scheme for forwarding a packet from the second device to the base station.

30 Claims, 15 Drawing Sheets

(56) References Cited

U.S. PATENT DOCUMENTS

| | | | | |
|---|---|---|---|---|
| 2011/0273999 | A1* | 11/2011 | Nagaraja | H04L 1/1692 |
| | | | | 370/252 |
| 2012/0230247 | A1* | 9/2012 | Kwon | H04B 7/022 |
| | | | | 370/315 |
| 2014/0078955 | A1* | 3/2014 | Nagaraja | H04B 7/2606 |
| | | | | 370/315 |
| 2014/0171062 | A1* | 6/2014 | Fallgren | H04W 40/22 |
| | | | | 455/422.1 |
| 2017/0318525 | A1* | 11/2017 | Cohen | H04B 7/14 |
| 2019/0081696 | A1* | 3/2019 | Kalhan | H04L 5/0048 |
| 2019/0281644 | A1* | 9/2019 | Hu | H04B 7/15528 |
| 2020/0136733 | A1* | 4/2020 | Hassan Hussein | H04W 76/14 |
| 2020/0314727 | A1* | 10/2020 | Xu | H04W 40/32 |

\* cited by examiner

SWITCHING TECHNIQUES FOR MESSAGE FORWARDING IN WIRELESS COMMUNICATIONS

CROSS REFERENCE

The present application for patent claims the benefit of U.S. Provisional Patent Application No. 62/956,165 by RAGHAVAN et al., entitled "SWITCHING TECHNIQUES FOR MESSAGE FORWARDING IN WIRELESS COMMUNICATIONS," filed Dec. 31, 2019, assigned to the assignee hereof, and expressly incorporated by reference herein.

FIELD OF TECHNOLOGY

The following relates generally to wireless communications and more specifically to switching techniques for message forwarding in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

The wireless multiple-access communications system may further support millimeter wave, or frequency range 2 (FR2), cooperative transmissions. That is, a wireless communications system may utilize frequencies that are greater than 6 GHz to wirelessly communicate between the multiple wireless devices. In such cases, one or more devices may act as a relay that may jointly transmit to a Next Generation Node B (gNB) using one of an amplify-and-forward (AF) or a decode-and-forward (DF) transmission scheme. Communications utilizing the FR2 spectrum, however, may utilize beamforming, which may not be considered in traditional AF or DF transmission schemes.

SUMMARY

The described techniques relate to improved methods, systems, devices, and apparatuses that support switching techniques for message forwarding in wireless communications. Generally, the described techniques provide for switching techniques for message forwarding from a device to a base station in wireless communications. In some examples, the device may be a user equipment (UE). The switching techniques may include a first message being received at a first device from a second device via a communications link, such as a sidelink communications link. The first device may select between a decode-and-forward (DF) or an amplify-and-forward (AF) transmission scheme. The selection may be made using one or more trigger conditions associated with the transmitting device, the receiving device, or the base station.

A method of wireless communications at a first device is described. The method may include receiving, via a communications link, a first message from a second device for forwarding by the first device to a base station, selecting, based on a set of trigger conditions associated with the first device, the second device, the communications link, or any combination thereof, between whether to decode the first message or to amplify the first message prior to forwarding to the base station, generating a second message based on the selection to decode the first message or to amplify the first message, where the second message includes at least a portion of the first message, and transmitting the second message to the base station.

An apparatus for wireless communications at a first device is described. The apparatus may include a processor, memory coupled with the processor, and instructions stored in the memory. The instructions may be executable by the processor to cause the apparatus to receive, via a communications link, a first message from a second device for forwarding by the first device to a base station, select, based on a set of trigger conditions associated with the first device, the second device, the communications link, or any combination thereof, between whether to decode the first message or to amplify the first message prior to forwarding to the base station, generate a second message based on the selection to decode the first message or to amplify the first message, where the second message includes at least a portion of the first message, and transmit the second message to the base station.

Another apparatus for wireless communications at a first device is described. The apparatus may include means for receiving, via a communications link, a first message from a second device for forwarding by the first device to a base station, selecting, based on a set of trigger conditions associated with the first device, the second device, the communications link, or any combination thereof, between whether to decode the first message or to amplify the first message prior to forwarding to the base station, generating a second message based on the selection to decode the first message or to amplify the first message, where the second message includes at least a portion of the first message, and transmitting the second message to the base station.

A non-transitory computer-readable medium storing code for wireless communications at a first device is described. The code may include instructions executable by a processor to receive, via a communications link, a first message from a second device for forwarding by the first device to a base station, select, based on a set of trigger conditions associated with the first device, the second device, the communications link, or any combination thereof, between whether to decode the first message or to amplify the first message prior to forwarding to the base station, generate a second message based on the selection to decode the first message or to amplify the first message, where the second message includes at least a portion of the first message, and transmit the second message to the base station.

In some examples of the method, apparatuses, and non-transitory computer-readable medium described herein, the set of trigger conditions associated with the first device includes a power availability at the first device, a thermal condition at the first device, a memory capacity of the first device, or a processing capability of the first device, or any combination thereof.

In some examples of the method, apparatuses, and non-transitory computer-readable medium described herein, the set of trigger conditions associated with the first device, the second device, the communications link, or any combination thereof, includes a beamforming parameter, the beamforming parameter including a first beamwidth of a first beam used for transmission of the first message from the second device to the first device, a second beamwidth of a second beam used for transmission of the second message from the first device to the base station, an array gain at the first device, or a Doppler effect of one or more of the first beam or the second beam, or any combination thereof.

In some examples of the method, apparatuses, and non-transitory computer-readable medium described herein, the set of trigger conditions associated with the first device, the second device, the communications link, or any combination thereof, includes a privacy condition for the first message, a security condition for the first message, a signal-to-noise ratio (SNR) at the first device, or a performance characteristic for transmission of the second message to the base station, or any combination thereof.

Some examples of the method, apparatuses, and non-transitory computer-readable medium described herein may further include operations, features, means, or instructions for establishing a set of communications links with a set of devices including the second device, receiving one or more first messages via the set of communications links, and transmitting one or more second messages to the base station in response to receiving the one or more first messages.

Some examples of the method, apparatuses, and non-transitory computer-readable medium described herein may further include operations, features, means, or instructions for selecting between whether to decode the first message or to amplify the first message may be based on one or more static conditions at the first device, the second device, or the base station, or any combination thereof.

Some examples of the method, apparatuses, and non-transitory computer-readable medium described herein may further include operations, features, means, or instructions for transmitting, to the base station, a preference of the first device to decode the first message or amplify the first message prior to forwarding to the base station.

In some examples of the method, apparatuses, and non-transitory computer-readable medium described herein, the preference of the first device may be based on a capability of the first device, available memory at the first device, processing capability of the first device, a thermal condition at the first device, or a power condition at the first device, or any combination thereof.

Some examples of the method, apparatuses, and non-transitory computer-readable medium described herein may further include operations, features, means, or instructions for receiving, from the base station, an indication to decode the first message or amplify the first message, where the selecting may be based on the indication.

In some examples of the method, apparatuses, and non-transitory computer-readable medium described herein, the indication to decode the first message or amplify the first message may be based on feedback from the first device, a preference of the first device, or link conditions of one or more communications links associated with the first device, or any combination thereof.

In some examples of the method, apparatuses, and non-transitory computer-readable medium described herein, the indication may be specific to the first device.

A method of wireless communications at a base station is described. The method may include establishing a first communications link with a first device that is in communication with a second device via a second communications link, selecting, based on a set of trigger conditions associated with the first UE, the second device, the first communications link, and the second communications link, between whether the first device is to decode a message or to amplify the first message prior to forwarding the first message from the second device to the base station, transmitting an indication instructing the first device to decode the first message or amplify the first message prior to forwarding the first message from the second device to the base station based on the selecting, and receiving a second message from the first device based on the indication, the second message including at least a portion of the first message.

An apparatus for wireless communications at a base station is described. The apparatus may include a processor, memory coupled with the processor, and instructions stored in the memory. The instructions may be executable by the processor to cause the apparatus to establish a first communications link with a first device that is in communication with a second device via a second communications link, select, based on a set of trigger conditions associated with the first device, the second device, the first communications link, and the second communications link, between whether the first device is to decode a message or to amplify the first message prior to forwarding the first message from the second device to the base station, transmit an indication instructing the first device to decode the first message or amplify the first message prior to forwarding the first message from the second device to the base station based on the selecting, and receive a second message from the first device based on the indication, the second message including at least a portion of the first message.

Another apparatus for wireless communications at a base station is described. The apparatus may include means for establishing a first communications link with a first device that is in communication with a second device via a second communications link, selecting, based on a set of trigger conditions associated with the first device, the second device, the first communications link, and the second communications link, between whether the first device is to decode a message or to amplify the first message prior to forwarding the first message from the second device to the base station, transmitting an indication instructing the first device to decode the first message or amplify the first message prior to forwarding the first message from the second device to the base station based on the selecting, and receiving a second message from the first device based on the indication, the second message including at least a portion of the first message.

A non-transitory computer-readable medium storing code for wireless communications at a base station is described. The code may include instructions executable by a processor to establish a first communications link with a first device that is in communication with a second device via a second communications link, select, based on a set of trigger conditions associated with the first device, the second device, the first communications link, and the second communications link, between whether the first device is to decode a message or to amplify the first message prior to forwarding the first message from the second device to the base station, transmit an indication instructing the first device to decode the first message or amplify the first message prior to forwarding the first message from the second device to the base station based on the selecting, and receive a second message from the first device based on the indication, the second message including at least a portion of the first message.

Some examples of the method, apparatuses, and non-transitory computer-readable medium described herein may further include operations, features, means, or instructions for receiving, via the first communications link, a transmission scheme message from the first device that indicates a preference of the first device for an amplify and forward or a decode and forward transmission scheme, and selecting between whether the first device may be to decode the first message or to amplify the first message based on the transmission scheme message.

In some examples of the method, apparatuses, and non-transitory computer-readable medium described herein, the preference may be specific to the second device.

In some examples of the method, apparatuses, and non-transitory computer-readable medium described herein, the transmission scheme message indicates multiple preferences for multiple devices in communication with the first device via respective communications links.

Some examples of the method, apparatuses, and non-transitory computer-readable medium described herein may further include operations, features, means, or instructions for receiving, via the first communications link, a feedback message from the first device that indicates one or more feedback for communications between the first device and the base station or between the first device and the second device, and selecting between whether the first device may be to decode the first message or amplify the first message based on the feedback message.

In some examples of the method, apparatuses, and non-transitory computer-readable medium described herein, the set of trigger conditions includes channel conditions between the first device and the second device, channel conditions between the first device and the base station, a power availability at the first device, a thermal condition at the first device, a memory capacity of the first device, or a processing capability of the first device, or any combination thereof.

DETAILED DESCRIPTION

Figure 1:
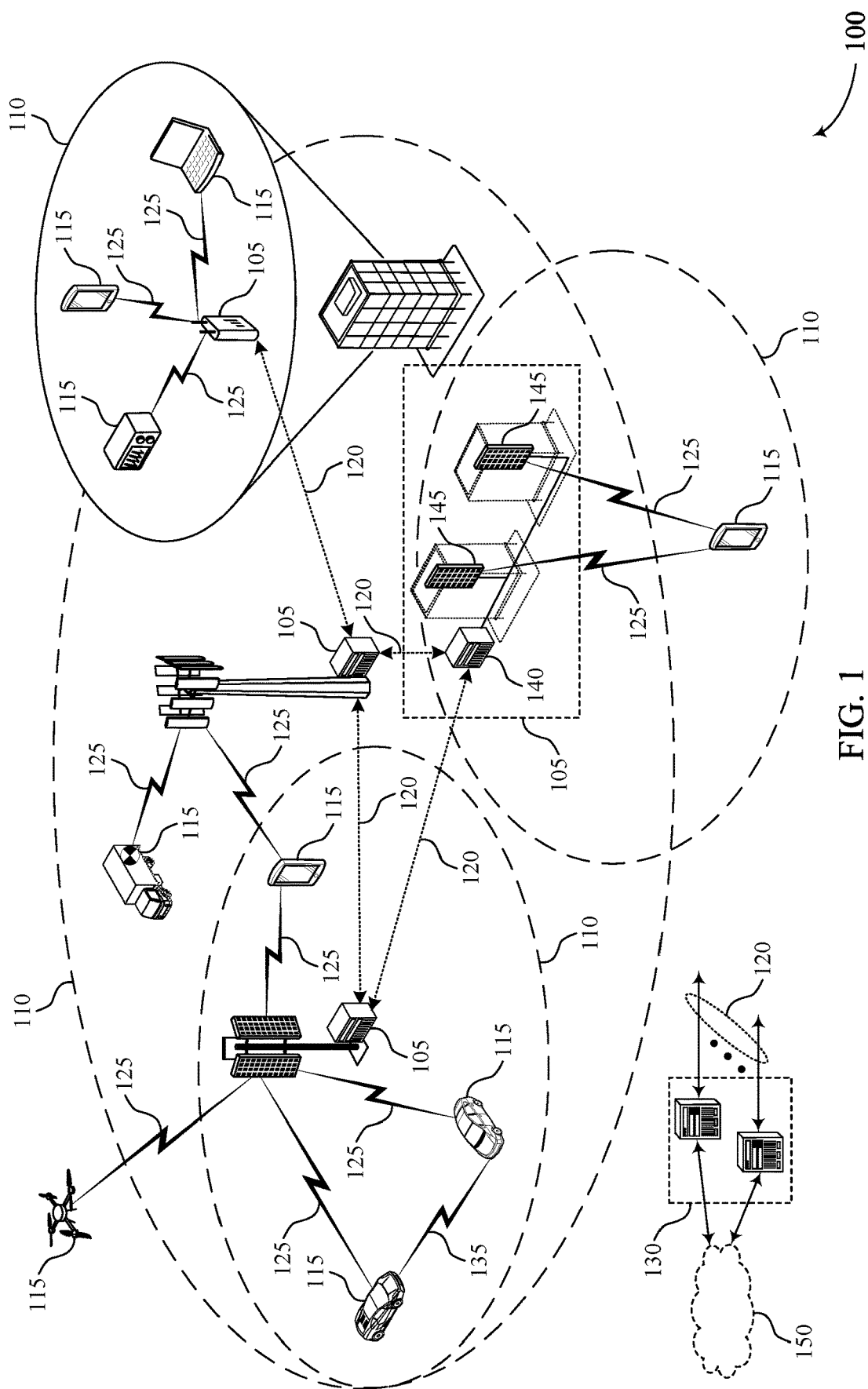
FIGS. 1 through 3 illustrate examples of wireless communications systems that support switching techniques for message forwarding in wireless communications in accordance with aspects of the present disclosure.

A wireless communications system may support both direct links (e.g., direct links) and sidelink communication links for communications between wireless devices. A direct link may refer to a communication link between a user equipment (UE) and a base station. For example, a direct link may support uplink signaling, downlink signaling, connection procedures, etc. A sidelink communication link may refer to any communication link between similar wireless devices (e.g., a communication link between UEs, a communication link between a sending UE and a relay UE, etc.). It is noted that while various examples provided herein are discussed for UE sidelink devices, such sidelink techniques may be used for any type of wireless devices that use sidelink communications. For example, a sidelink may support device-to-device (D2D) communications, vehicle-to-everything (V2X) or vehicle-to-vehicle (V2V) communications, message relaying, discovery signaling, beacon signaling, or any combination of these or other signals transmitted over-the-air from one wireless device to one or more other wireless devices.

As demand for wireless communications and sidelink communications increases (e.g., due to increased V2X demand for autonomous and semi-autonomous vehicles, D2D communication between Internet-of-Things (IoT) devices, factory automation, etc.), techniques to efficiently and reliably enhance throughput and reliability of frequency range 2 (FR2) spectrum wireless communications are desirable. The described techniques relate to improved methods, systems, devices, and apparatuses that support FR2 spectrum wireless communications between at least one UE and a base station, or gNB. Generally, the described techniques provide for efficient transmissions between a first UE (UE1), a second relay UE (UE2) and a gNB utilizing a millimeter wave (mmW) frequency band (e.g., FR2, FR4, etc.).

In some examples of a wireless communications system, the UE1 may send a transmission to the gNB over a direct link or the UE1 may send the transmission to the gNB via an indirect link (e.g., a sidelink via UE2). The UE2 may receive the transmission from the UE1 via the sidelink and may then forward the received transmission to the gNB. In some cases, the UE2 may select one of a amplify-and-forward (AF) or a decode-and-forward (DF) transmission scheme for forwarding the received transmission to the gNB. For example, the UE2 may determine whether to utilize the AF scheme or the DF scheme based on a number of factors such as power availability at the UE2, thermal overhead at the UE2, available memory at the UE2, processing capabilities at the UE2, link budget between the UE2 and the gNB, and various other hardware constraints, among other factors.

In some examples of a wireless communications system, a UE2 may act as a sidelink device for multiple UEs or as a relay device between the multiple UEs and the gNB. In some examples, the UE2 may communicate support or a preference for one of the AF or the DF schemes to be used in retransmissions from the UE2 to the gNB using the FR2 spectrum. Additionally or alternatively, the determined retransmission scheme may be based on one or more static or dynamic factors associated with UE2, such as those mentioned above with respect to the UE2. In some examples, the determined retransmission scheme may be communicated to the gNB by the UE2, which may be based on an analysis by the gNB of the one or more static or dynamic factors at the UE2.

Particular aspects of the subject matter described herein may be implemented to realize one or more advantages. The described techniques may support improvements in communications using mmW transmissions, decreasing signaling overhead, and improving reliability, among other advantages. As such, supported techniques may include improved network operations and, in some examples, may promote network efficiencies, among other benefits.

Aspects of the disclosure are initially described in the context of wireless communications systems. Aspects are also described with respect to a process flow. Aspects of the disclosure are further illustrated by and described with reference to apparatus diagrams, system diagrams, and flowcharts that relate to switching techniques for message forwarding in wireless communications.

FIG. 1 illustrates an example of a wireless communications system 100 that supports switching techniques for message forwarding in wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base station 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 Megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-s-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more the resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or any combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 Megahertz (MHz) to 300 Gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beamforming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 in wireless communications system 100 may be in communication with another UE 115 via a sidelink communications link (e.g., D2D communications link 135). The UE 115 may receive a message from the other UE 115 and may forward the message to a base station 105. Prior to forwarding, the UE 115 may select a transmission scheme, such as an AF or DF transmission scheme, and may use the selected transmission scheme for forwarding the message to the base station 105. The transmission scheme may be selected based on one or more factors (e.g., trigger conditions) of the UE 115, the base station 105, or other channel conditions such as sidelink channel conditions or direct link (e.g., link between UE 115 and base station 105) conditions. For instance, the factors may include capabilities (e.g., memory, processing) of the UE 115, beamforming parameters of the sidelink or direct link, privacy or security conditions, SNR, or other trigger conditions.

Figure 2:
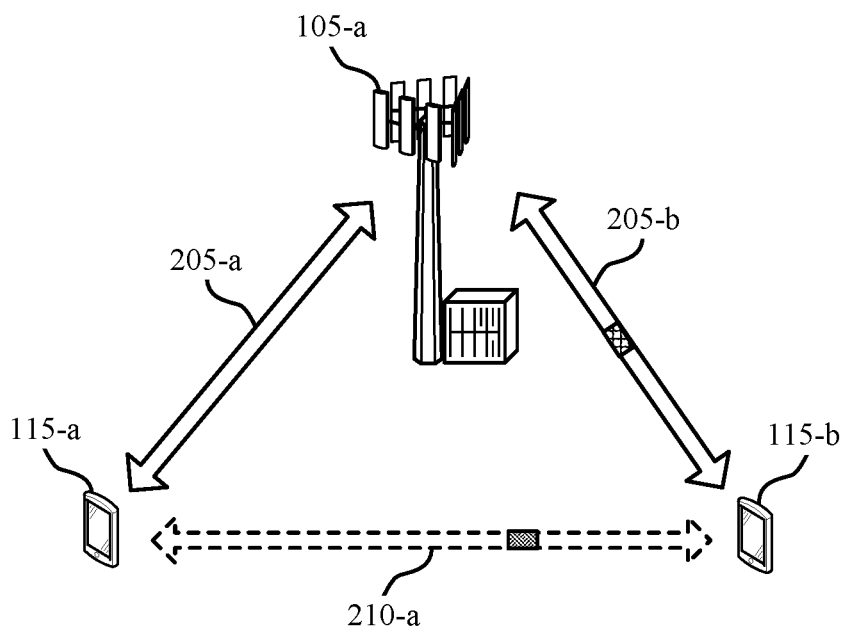
Figure 2:
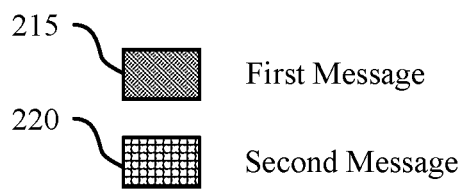

FIG. 2 illustrates an example of a wireless communications system 200 that supports switching techniques for message forwarding in wireless communications in accordance with aspects of the present disclosure. In some examples, wireless communications system 200 may implement aspects of wireless communications system 100. In some examples, the wireless communications system 200 may include a UE 115-a, a UE 115-b, and a base station 105-a which may be examples of UEs 115 and base stations 105 described with reference to FIG. 1. In some examples, UE 115-a may function as a sending UE and UE 115-b may function as a relay UE. One or more of the UEs 115 may communicate with base station 105 using a corresponding direct link 205. In some examples, base station 105-a may communicate with UE 115-a via direct link 205-a and may communicate with UE 115-b via direct link 205-b.

In some examples, the UEs 115 may communicate with one or more UEs 115 using a corresponding sidelink 210. In this example, UE 115-a may communicate with UE 115-b via sidelink 210-a. UE 115-a and 115-b may be members of a sidelink communications group, in which members of the group may communicate with other members of the group to provide data or other information via sidelink communication links, such as sidelink 210-a. In some cases, an applications layer at base station 105-a may prompt creation of the sidelink communications group, and the group may be established through communications with the applications layer of other UEs 115 in the group. It is noted that the illustrated sidelink communications group provides communication between two UEs 115, which are illustrated in wireless communications system 200 for the sake of brevity, and the techniques described herein may be applicable to other numbers of UEs 115 within a system that may establish a communications group. Further, sidelink communication techniques may be used for D2D communication with wireless devices other than UEs, such as base station communications (e.g., wireless backhaul links between base stations or TRPs, etc.), communications between access points, and the like.

In some examples, UE 115-a may transmit a first message 215 via sidelink 210-a to UE 115-b for forwarding to base station 105-a. In such examples, UE 115-b may determine, based on a number of factors, to perform one of the AF or DF transmission schemes on first message 215 as part of the forwarding of first message 215 to base station 105-a in the form of a second message 220. In a DF transmission scheme, the UE 115-b may decode the first message 215 and encode (e.g., re-encode) the decoded first message 215 to form second message 220 prior to forwarding the second message 220 to base station 105-a. In an AF transmission scheme, the UE 115-b may refrain from decoding the first message 215, and may instead amplify at least a portion of the received first message 215 to form a second message 220 prior to forwarding the second message 220 to the base station 105-a. The UE 115-b may therefore act as a relay, an analog or digital repeater, a customer premises equipment (CPE), or another suitable device type.

In some cases, UE 115-b may determine to perform one of the AF or DF transmission schemes on the received first message 215 and may switch between the AF or DF transmission schemes as part of transmitting all or some of first message 215 as a second message 220 to base station 105-a. In such examples, UE 115-b may select one of the AF or DF transmission schemes based on factors associated with the first message 215, UE 115-b, base station 105-a, direct link 205-b, or sidelink 210-a. For example, these factors may include an SNR measured by UE 115-b, hardware parameters of UE 115-b (e.g., processing capability), thermal parameters of UE 115-b, or power availability at UE 115-b, among other factors.

In some examples, UE 115-b may determine the transmission scheme based on SNR satisfying a threshold (e.g., a predetermined threshold or value). For instance, UE 115-b may determine to perform the DF transmission scheme on first message 215 when the SNR of first message 215 is lower than a predetermined SNR value and UE 115-b may determine to perform the AF transmission scheme on first message 215 when the SNR of first message 215 is higher than the predetermined SNR value. In other examples, because the DF transmission scheme may include privacy-based encoding at UE 115-a of the data contained within first message 215, UE 115-b may determine to perform the DF transmission scheme on first message 215 when privacy concerns associated with the data within first message 215 are minimal. Accordingly, in some examples, UE 115-B may determine to perform the AF transmission scheme on first message 215 when there are privacy concerns associated with the data of the first message 215.

A power consumption of UE 115-b may be greater when the DF transmission scheme is performed on first message 215 at UE 115-b as compared to the power consumption of UE 115-b when the AF transmission scheme is performed on first message 215. The greater power consumption, due at least in part to an increased and more complex processing load at a UE 115-b, and a corresponding increase in heat generation of UE 115-b when performing the DF transmission scheme may be caused by decoding at least a portion of first message 215 prior to forwarding second message 220. Accordingly, UE 115-b may determine to perform the DF transmission scheme on first message 215 based on one or more of a power availability or a thermal overhead (i.e., how much additional heat generation may be tolerated by UE 115-b during operation of UE 115-b) at UE 115-b that are above predetermined amounts, and may determine to perform the AF transmission scheme on first message 215 when one or more of the power availability or the thermal overhead are below the predetermined amounts.

In some examples, UE 115-b may determine to perform one of the DF or AF transmission schemes on first message 215 based on one or more of a processing capability or a memory/data storage capacity at UE 115-b. For example, performance of the DF transmission scheme by UE 115-b may be processing intensive and utilize additional memory as compared to performance of the AF transmission scheme by UE 115-b. As such, UE 115-b may determine, based on an assessment of its own capabilities, to perform the DF transmission scheme in instances where UE 115-b includes enhanced processing capabilities and sufficient memory capacity (e.g., UE 115-b may be a smart repeater). UE 115-b may determine to perform the AF transmission scheme when UE 115-*b* does not have sufficient processing and/or memory capacities for the DF transmission scheme.

In some cases, UE 115-*b* may determine to perform one of the DF or AF transmission schemes on first message 215 based on a link budget between base station 105-*a* and UE 115-*b*. For example, because use of the DF transmission scheme may yield second message 220 including data that has been decoded at UE 115-*b*, second message 220 may be transmitted to base station 105-*a* using fewer antennas or a smaller array gain as compared to transmitting second message 220 to base station 105-*a* using the AF transmission scheme. Accordingly, UE 115-*b* may determine to perform the DF transmission scheme on first message 215 to increase the link budget between base station 105-*a* and UE 115-*b*. For example, UE 115-*b* may use the DF transmission scheme if a received SNR or link budget seen at base station 105-*a* is insufficient or too low when UE 115-*b* uses the AF transmission scheme.

In some cases, UE 115-*b* may determine to perform one of the DF or AF transmission schemes based on a type of beam used by UE 115-*a* to transmit first message 215 to UE 115-*b*. Use of a narrow beam to transmit first message 215 to UE 115-*b* may reduce Doppler effects within first message 215 and UE 115-*b* may determine to perform the AF transmission scheme on first message 215 based on the use of the narrow beam. For example, a narrower beam may be less affected by Doppler due to inter-ray or cluster mixing of signals, so the AF transmission scheme may be sufficient for retransmissions to base station 105-*a*. Additionally or alternatively, UE 115-*b* may determine to perform the DF transmission scheme on first message 215 based on the use of a wider beam to transmit first message 215 from UE 115-*a* to UE 115-*b*, which may indicate an increased presence of Doppler effects within first message 215. In such an example, use of the DF transmission scheme by UE 115-*b* may facilitate removing some or all of the Doppler effects from within first message 215.

Some of the examples described herein are in the context of a second UE 115 operating as a relay device for a first UE 115 via a sidelink communications link. However, these techniques may be applied for other scenarios as well. For example, these techniques may be implemented for communication between one or more UEs, repeater devices, relay devices, or the like, or any combination thereof. In some examples, a communications link (e.g., between a first device and a second device) may be an example of a sidelink communications link, a relay communications link, a repeater communications link, or the like, or any combination thereof. In an example, a dedicated relay device may have an option to switch between an AF and a DF transmission scheme when operating as a relay for a UE 115.

Figure 3:
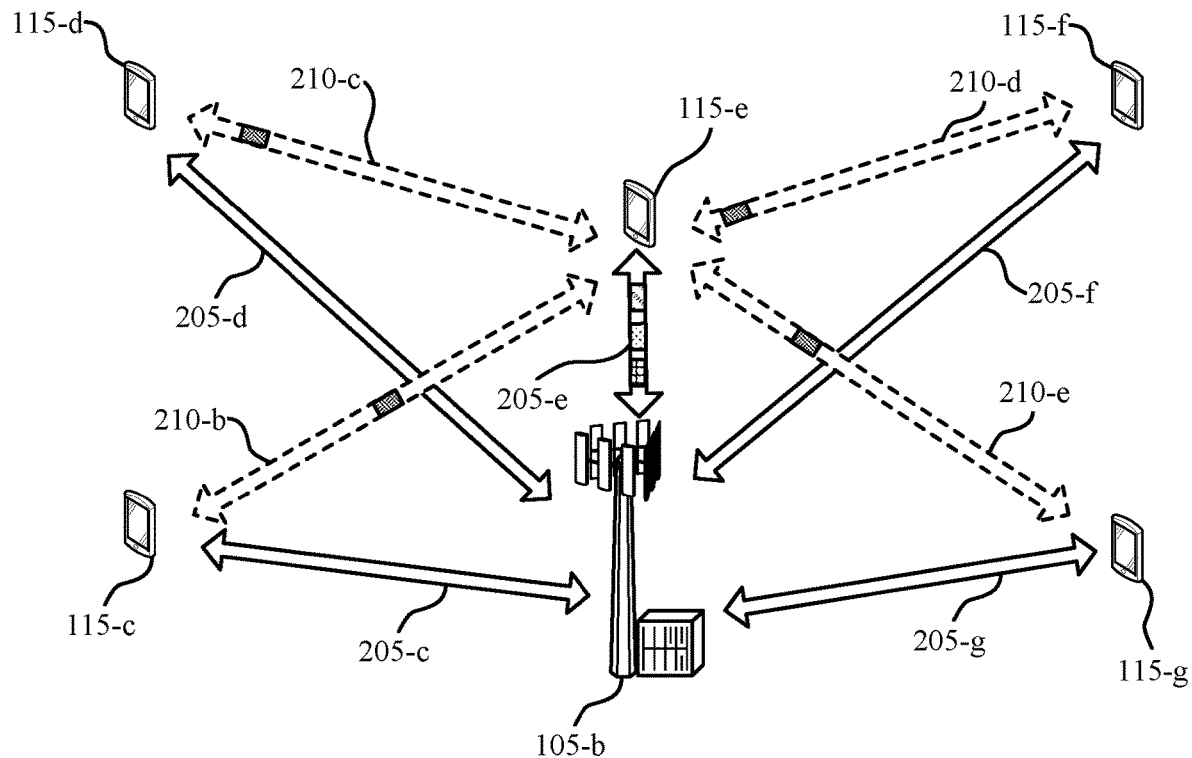
Figure 3:
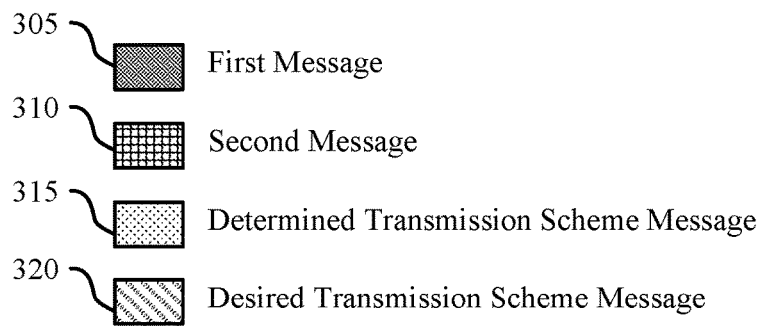

FIG. 3 illustrates an example of a wireless communications system 300 that supports switching techniques for message forwarding in wireless communications in accordance with aspects of the present disclosure. In some examples, wireless communications system 300 may implement aspects of wireless communications systems 100 or 200. In some examples, the wireless communications system 300 may include a UE 115-*c*, a UE 115-*d*, a UE 115-*e*, a UE 115-*f*, a UE 115-*g*, and a base station 105-*b* which may be examples of UEs 115 and base stations 105 described with reference to FIGS. 1 and 2. In this example, UE 115-*e* may function as a relay, and UEs 115-*c*, 115-*d*, 115-*f*, and 115-*g* may function as sending UEs 115 configured to send messages to base station 105-*b* via relay UE 115-*c*.

UE 115-*e* may communicate with base station 105-*b* via a corresponding direct link 205 and one or more of the sending UEs 115 may communicate with UE 115-*e* via a corresponding sidelink 210. In this example, base station 105-*b* may communicate with UE 115-*c* via direct link 205-*c*, with UE 115-*d* via direct link 205-*d*, with UE 115-*e* via direct link 205-*e*, with UE 115-*f* via direct link 205-*f*, and with UE 115-*g* via direct link 205-*g*. As shown, UE 115-*e* may communicate with sending UEs 115-*c*, 115-*d*, 115-*f*, and 115-*g* and may receive transmissions from the sending UEs 115 via a corresponding ones of sidelinks 210-*b*, 210-*c*, 210-*d*, and 210-*e*.

According to some aspects, the sending UEs 115 may be members of a relay communications group, in which members of the group may communicate with base station 105-*b* directly via corresponding direct links 205 or indirectly via relay UE 115-*e* and sidelinks 210. The sending UEs 115 may provide data or other information via respective sidelinks 210 extending between the sending UEs 115 and UE 115-*e* and via the direct link 205-*e* extending between UE 115-*e* and base station 105-*b*. In some cases, an applications layer at UE 115-*e* or one of the sending UEs 115 may prompt creation of the relay communications group, and the group may be established through communications with the applications layer of other UEs in the group. The illustrated relay communications group may provide communication between four sending UEs 115 and one relay UE 115, which are illustrated in wireless communications system 300 for the sake of brevity, and the techniques described herein may be applicable to other numbers of UEs 115, including other numbers of sending UEs 115 and relay UEs 115 within a system that may establish a relay communications group. Further, sidelink communication techniques may be used for D2D relay-type communication with wireless devices other than UEs, such as base station communications (e.g., wireless backhaul links between base stations or TRPs, etc.), communications between access points, and the like.

In some examples, one or more of the sending UEs 115 may transmit a first message 305 via a corresponding sidelink 210 to UE 115-*e* for forwarding to base station 105-*b* via direct link 205-*e*. In some examples, and as described above, UE 115-*e*, acting as a relay UE, may determine to perform one of the AF or DF transmission schemes on first message 305 as part of the retransmission of first message 305 to base station 105-*b* in the form of a second message 310. UE 115-*e* may receive first messages 305 from one or more of UE 115-*c*, UE 115-*d*, UE 115-*f*, or UE 115-*g* simultaneously, sequentially, or in any other order, and may perform one of the AF or DF transmission scheme on one or more of first messages 305. In some examples, UE 115-*e* may act as one or more of an analog or digital repeater, a CPE, or another suitable device.

Relay UE 115-*e*, upon receiving a first message 305, may determine to perform one of the AF or DF transmission schemes on first message 305 based on a variety of static or dynamic conditions present at UE 115-*e*, at the sending UE 115, at base station 105-*b*, within direct link 205-*e*, or within a corresponding one of the sidelinks 210 between the sending UE 115 and UE 115-*e*. These static and dynamic conditions may include, for example, the SNR present in first message 305, privacy concerns associated with data contained within first message 305, hardware parameters at UE 115-*e* (e.g., processing capability, memory capacity), power availability at UE 115-*e*, and thermal conditions at UE 115-*e*, among others. In some cases, UE 115-*e* may perform the determined one of the AF or DF transmission schemes on the one or more first messages 305 and may then forward the resulting second message 310, which includes all or a portion of first message 305, to base station 105-*b* via direct link 205-*e*.

In some examples, UE 115-*e*, after having determined to perform one of the AF or DF transmission schemes on one or more first message(s) 305, may transmit, via direct link 205-*e*, a determined transmission scheme indication 315 indicating the determined transmission scheme for a corresponding first message 305 to base station 105-*b*. In some cases, the determined transmission scheme may be UE-specific such that UE 115-*e* may transmit respective determined transmission schemes for multiple sending UEs 115, and the determined transmission schemes may be different for one or more of the multiple sending UEs 115. In some examples, determined transmission scheme indication 315 may be transmitted to base station 105-*b* before first message 305 is transmitted, concurrently with the transmission of first message 305, or after the transmission of first message 305 to base station 105-*b*. In some examples, UE 115-*e* may dynamically generate determined transmission scheme indications 315 that are specific to each received first message 305. In other examples, UE 115-*e* may default to generation of determined transmission scheme indications 315 that indicate performance of one of the AF or DF transmission schemes based on a static condition or parameter present at UE 115-*e*. In such examples, UE 115-*e* may not have a processing capability to perform the DF transmission scheme on the one or more first message 305, or a privacy of data contained within all incoming first messages 305 may be of a substantial concern, so UE 115-*e* may default to performing only the AF transmission scheme and the corresponding determined transmission scheme indication 315 may reflect this default.

In some examples, base station 105-*b* may request that UE 115-*e* perform one of the AF or DF transmission schemes on a corresponding first message 305 as part of generating second message 310. In some examples, base station 105-*b* may evaluate a received determined transmission scheme indication 315 as part of determining to request that UE 115-*e* perform one of the AF or DF transmission scheme. Base station 105-*b* may analyze parameters and conditions associated with UE 115-*e*, the sending UEs 115, the direct links 205, and the sidelinks 210, among other factors, to determine and to request that UE 115-*e* perform one of the AF or DF transmission schemes. In some examples, these parameters may include a rate at which transmissions are performed or received at UE 115-*e*, a diversity of the type of transmissions being received by UE 115-*e* from the sending UEs 115 (e.g., operational data, sensitive messages, data having associated privacy concerns), or a latency of a portion of wireless communications system 300 (e.g., of the wireless communications system 300 as a whole, of UE 115-*e*, of first message 305, or of second message 310).

Base station 105-*b* may transmit, via direct link 205-*e*, a desired transmission scheme indication 320 to UE 115-*e* including a request for UE 115-*e* to perform one of the AF or DF transmission scheme determined by base station 105-*b*. In some examples, upon receiving desired transmission scheme indication 320 by UE 115-*e*, UE 115-*e* may perform one of the AF or DF transmission schemes on the corresponding second message 310 in accordance with the request contained within the desired transmission scheme indication 320. In some examples, UE 115-*e* may receive the desired transmission scheme indication 320 and may perform, on the first message 305, the one of the AF or DF transmission schemes determined by the UE 115-*e*.

Figure 4:
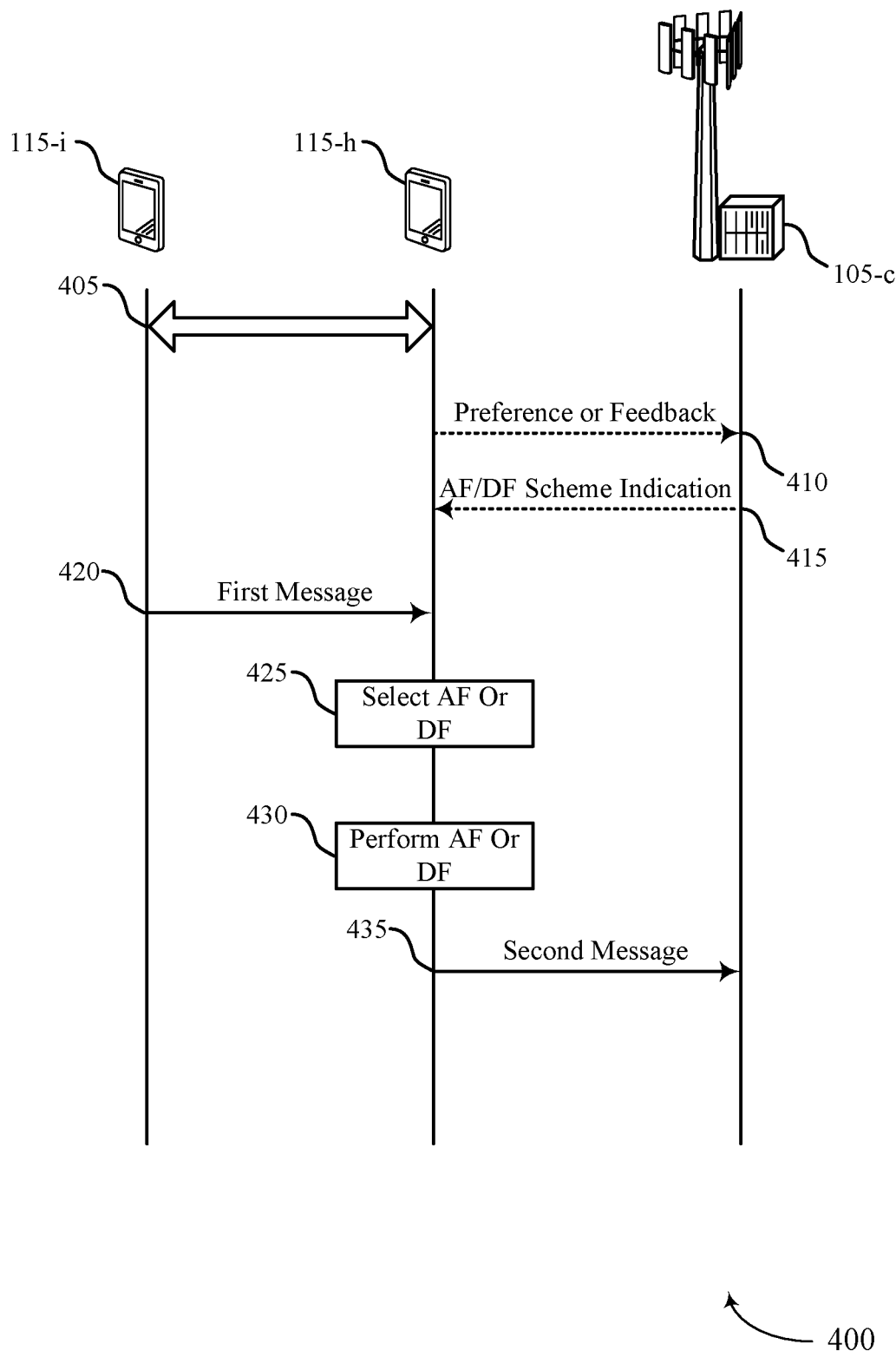
FIG. 4 illustrates an example of a process flow that supports switching techniques for message forwarding in wireless communications in accordance with aspects of the present disclosure.

FIG. 4 illustrates an example of a process flow 400 that supports switching techniques for message forwarding in wireless communications in accordance with aspects of the present disclosure. In some examples, process flow 400 may implement aspects of wireless communications systems 100, 200, or 300. Process flow 400 may be implemented by a base station 105-*c*, a sending UE 115-*i*, and a relay or receiving UE 115-*h*.

At 405, a communication link may be established between sending UE 115-*i* and receiving UE 115-*h*. Although not shown, receiving UE 115-*h* may establish communications links with multiple UEs 115 and may act as a relay for each of the multiple UEs 115.

At 410, UE 115-*h* may optionally determine a preference for one of an AF or DF scheme to be used for forwarding message from UE 115-*i* to base station 105-*c* via UE 115-*h* and send an indication of the preference to base station 105-*c*. In some examples, the preference may be specific to UE 115-*i*. Additionally or alternatively, UE 115-*h* may transmit feedback to the base station 105-*c*, which may include information regarding the channel conditions between UE 115-*h* and UE 115-*i*, or the channel conditions between UE 115-*h* and base station 105-*c*.

At 415, base station 105-*c* may optionally determine an AF or DF transmission scheme that UE 115-*h* is to use for forwarding messages to the base station 105-*c* from UE 115-*i*. In some cases, the AF or DF transmission scheme may be determined by base station 105-*c* based on the preference indicated to the base station 105-*c* from UE 115-*h* at 410. The base station 105-*c* may also consider other factors in determining the AF or DF transmission scheme, such as sidelink channel conditions (e.g., channel conditions between UE 115-*h* and UE 115-*i*) or direct link channel conditions (e.g., channel conditions between UE 115-*h* and base station 105-*c*).

At 420, UE 115-*i* may transmit a first message to UE 115-*h*. UE 115-*h* may receive the first message via the communication link established at 405. The first message may be transmitted and received according to configured beamforming parameters. For example, UE 115-*i* may utilize transmission beam parameters for transmitting the first message and UE 115-*h* may utilize reception beam parameters for receiving the first message.

At 425, UE 115-*h* may select one of AF or DF transmission scheme to use for forwarding the first message to the base station 105-*c*. The selection may be made based on the AF/DF indication transmitted by base station 105-*c* at 415. Additionally or alternatively, the selection may be made based on one or more trigger conditions. Such trigger conditions may include a power availability at the UE 115-*h*, a thermal overhead condition at the UE 115-*h*, a memory capacity of the UE 115-*h*, or a processing capability of the UE 115-*h*. The trigger conditions may include a beamforming parameter such as a first beamwidth of a first beam used for transmission of the first message, a second beamwidth of a second beam used for forwarding the first message to the base station 105-*c*, an array gain at the UE 115-*h*, or a Doppler effect of one or more of the first beam or the second beam, or any combination thereof. Additionally or alternatively, the selection may be based on a privacy condition for the first message, a security condition for the first message, an SNR at UE 115-*h*, or a performance characteristic for forwarding the first message to the base station 105-*c*.

At 430, UE 115-*h* may perform AF or DF in accordance with the transmission scheme selected at 425. That is, the UE 115-*h* may amplify the first message prior to forwarding to base station 105-*c* in an AF transmission scheme. In a DF transmission scheme, the UE 115-*h* may decode the first message prior to forwarding to base station 105-*c*. The UE 115-*h* may encode at least a portion of the decoded first message to form a second message prior to sending to base station 105-*c*. The encoding may be performed using different parameters than those used for encoding the first message prior to transmission from the UE 115-*i*.

At 435, the UE 115-*h* transmits the second message, which includes at least a portion of the first message, to the base station 105-*c* after performing AF or DF.

Figure 5:
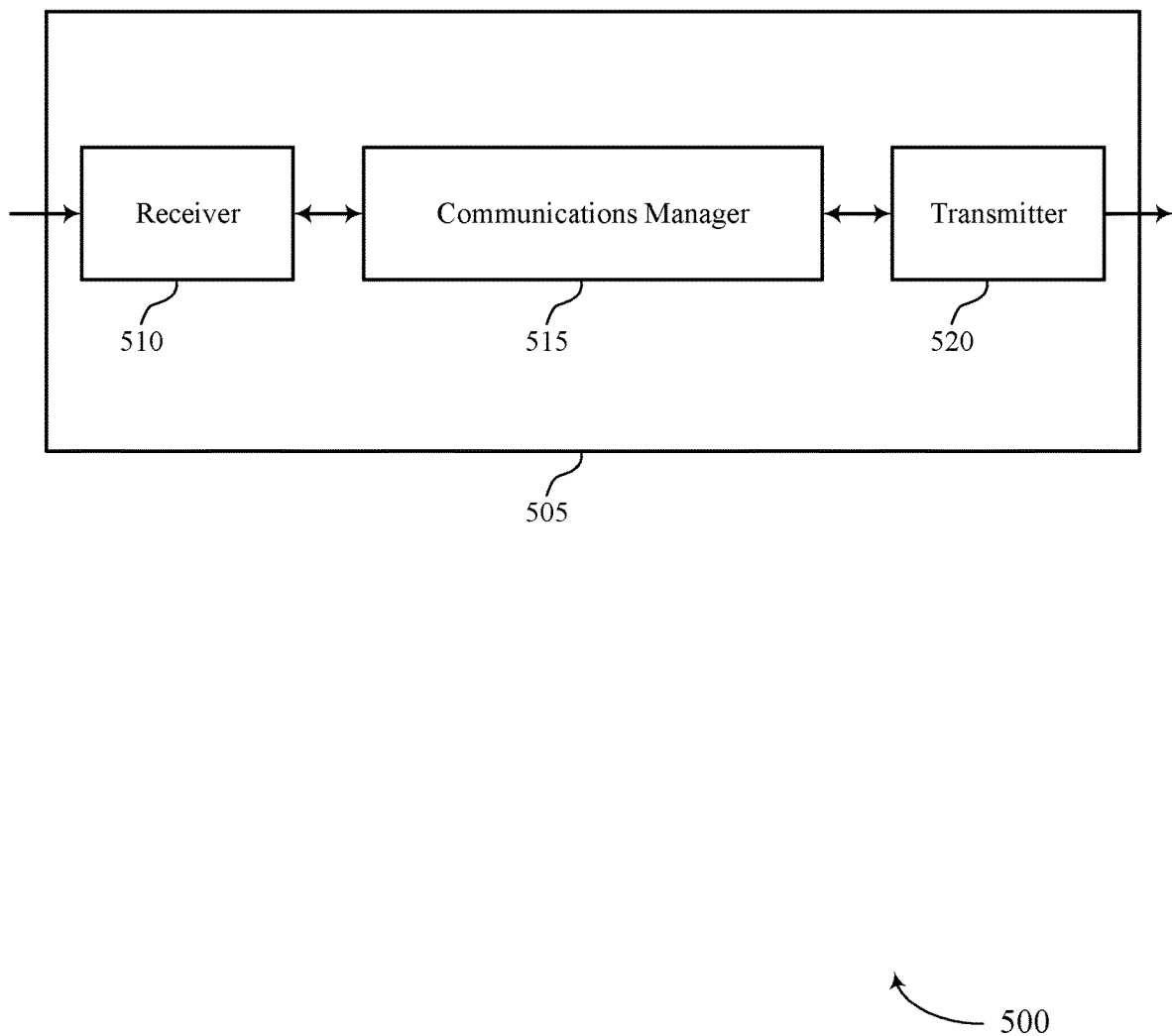
FIGS. 5 and 6 show block diagrams of devices that support switching techniques for message forwarding in wireless communications in accordance with aspects of the present disclosure.

FIG. 5 shows a block diagram 500 of a device 505 that supports switching techniques for message forwarding in wireless communications in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to switching techniques for message forwarding in wireless communications, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, via a communications link, a first message from a second device for forwarding by the first device to a base station, select, based on a set of trigger conditions associated with the first device, the second device, the communications link, or any combination thereof, between whether to decode the first message or to amplify the first message prior to forwarding to the base station, generate a second message based on selecting to decode the first message or to amplify the first message, where the second message includes at least a portion of the first message, and transmit the second message to the base station. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a fully programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or any combination thereof in accordance with various aspects of the present disclosure.

The actions performed by the communications manager 515 as described herein may be implemented to realize one or more potential advantages. One implementation may enable a device, such as a relay UE or relay device, to select between AF and DF transmission schemes prior to forwarding a message from another device to a base station. This selection may be dynamic and based on channel conditions, beam parameters, or capabilities of the device. Such techniques may improve the likelihood of a successful decoding of the forwarded message at the base station, which may result in higher throughput and more efficient communications (e.g., less communication errors), among other advantages. Such techniques may also allow for device-specific AF or DF transmission schemes allowing a device to use AF for one device and DF for another device.

Based on implementing the techniques as described herein, a processor of a device (e.g., a processor controlling the receiver 510, the communications manager 515, the transmitter 520, or any combination thereof) may increase the likelihood of successful forwarding from one device to a base station. For example, the techniques described herein may leverage performance advantages for each of AF or DF depending on device capabilities and channel conditions, which may result in reduced signaling overhead and power savings, among other benefits.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
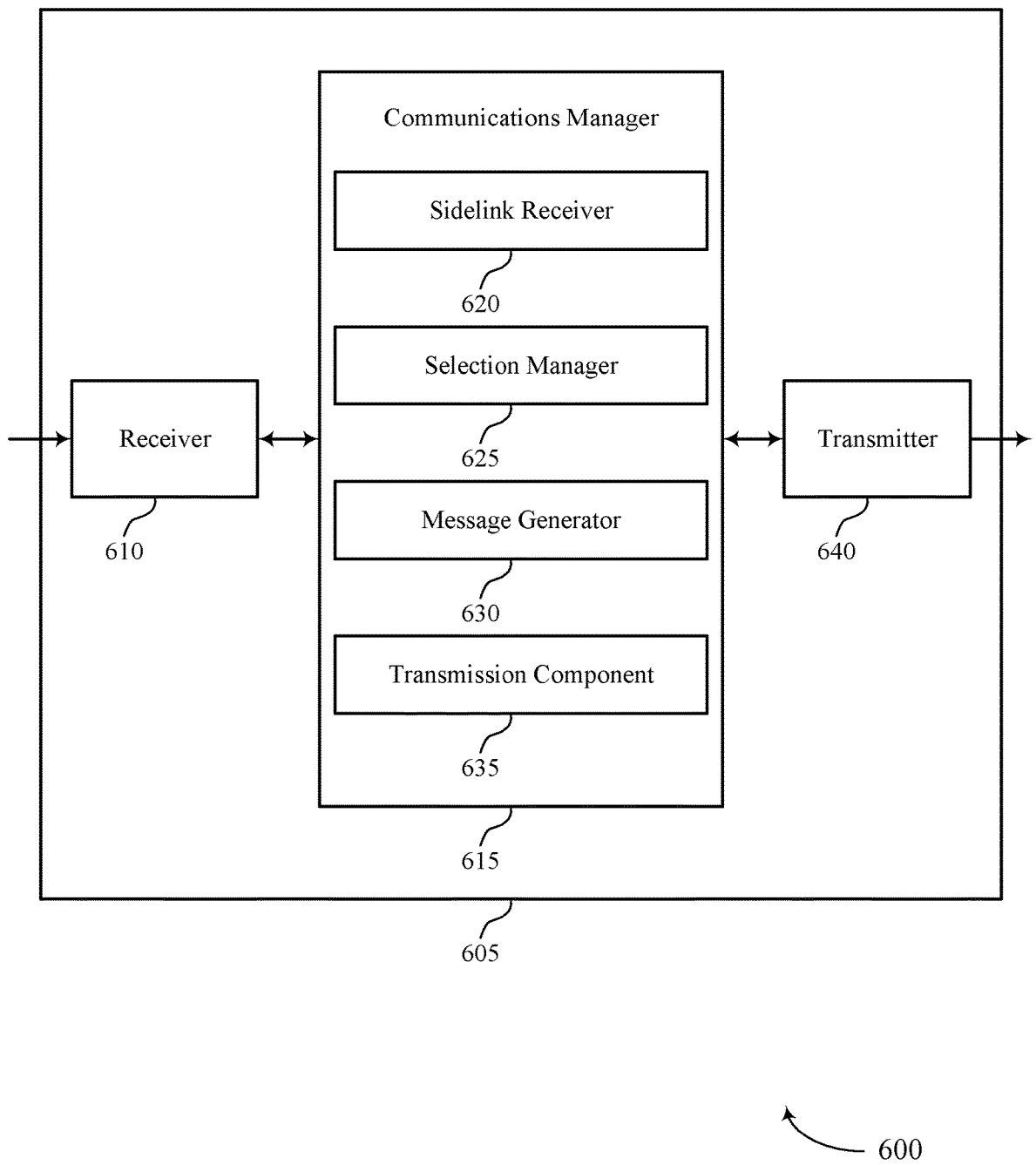

FIG. 6 shows a block diagram 600 of a device 605 that supports switching techniques for message forwarding in wireless communications in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to switching techniques for message forwarding in wireless communications, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a sidelink receiver 620, a selection manager 625, a message generator 630, and a transmission component 635. The communications manager 615 may be an example of aspects of the communications manager 810 described herein.

The sidelink receiver 620 may receive, via a communications link, a first message from a second device for forwarding by the first device to a base station.

The selection manager 625 may select, based on a set of trigger conditions associated with the first device, the second device, the communications link, or any combination thereof, between whether to decode the first message or to amplify the first message prior to forwarding to the base station.

The message generator 630 may generate a second message based on selecting to decode the first message or to amplify the first message, where the second message includes at least a portion of the first message. The transmission component 635 may transmit the second message to the base station.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
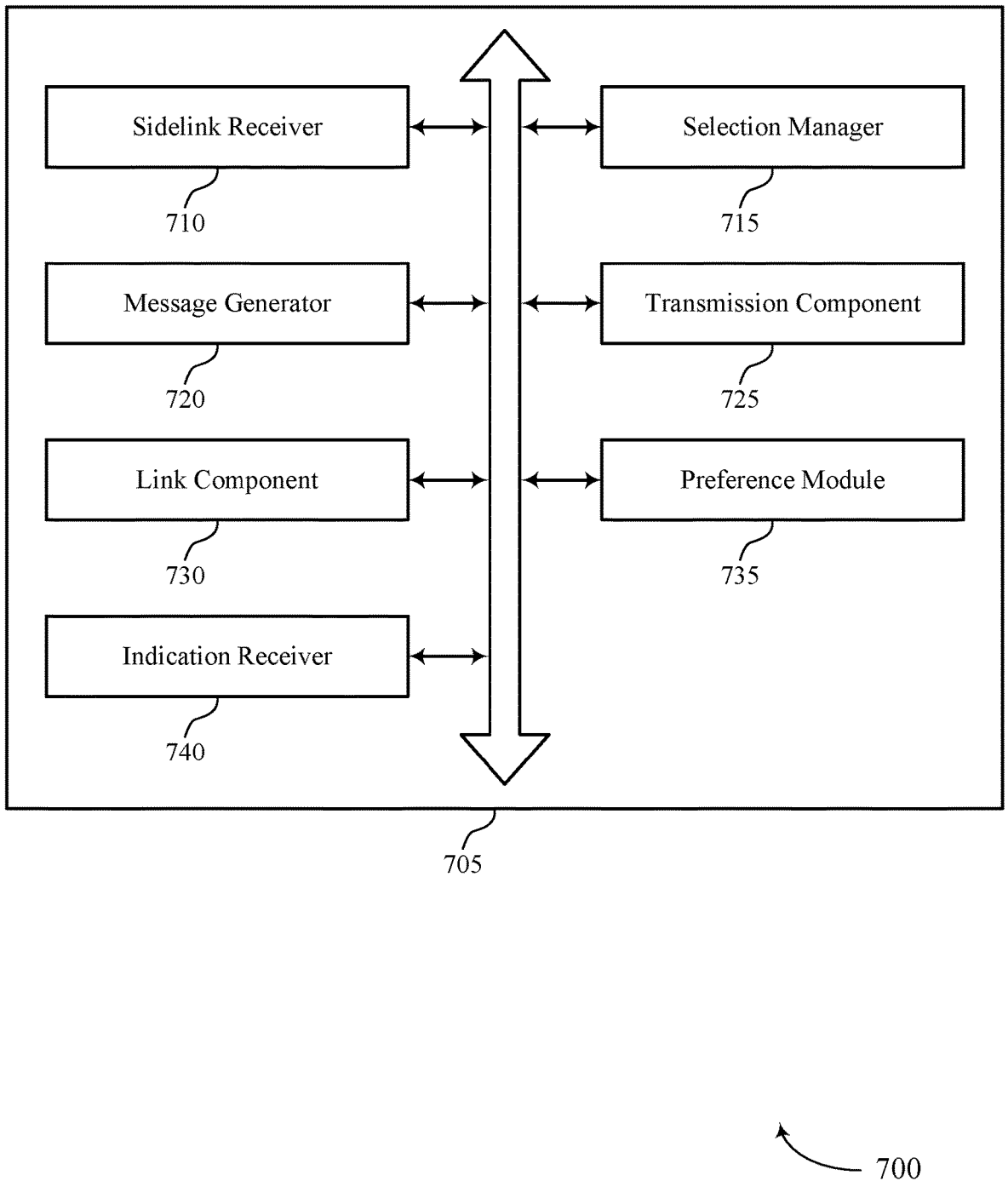
FIG. 7 shows a block diagram of a communications manager that supports switching techniques for message forwarding in wireless communications in accordance with aspects of the present disclosure.

FIG. 7 shows a block diagram 700 of a communications manager 705 that supports switching techniques for message forwarding in wireless communications in accordance with aspects of the present disclosure. The communications manager 705 may be an example of aspects of a communications manager 515, a communications manager 615, or a communications manager 810 described herein. The communications manager 705 may include a sidelink receiver 710, a selection manager 715, a message generator 720, a transmission component 725, a link component 730, a preference module 735, and an indication receiver 740. Each of these modules may communicate, directly or indirectly, with one another (e.g., via one or more buses).

The sidelink receiver 710 may receive, via a communications link, a first message from a second device for forwarding by the first device to a base station. In some examples, the sidelink receiver 710 may receive one or more first messages via the set of communications links.

The selection manager 715 may select, based on a set of trigger conditions associated with the first device, the second device, the communications link, or any combination thereof, between whether to decode the first message or to amplify the first message prior to forwarding to the base station.

In some examples, the selection manager 715 may select between whether to decode the first message or to amplify the first message is based on one or more static conditions at the first device, the second device, or the base station, or any combination thereof.

In some cases, the set of trigger conditions associated with the first device includes a power availability at the first device, a thermal condition at the first device, a memory capacity of the first device, or a processing capability of the first device, or any combination thereof.

In some cases, the set of trigger conditions associated with the first device, the second device, the communications link, or any combination thereof, includes a beamforming parameter, the beamforming parameter including a first beamwidth of a first beam used for transmission of the first message from the second device to the first device, a second beamwidth of a second beam used for transmission of the second message from the first device to the base station, an array gain at the first device, or a Doppler effect of one or more of the first beam or the second beam, or any combination thereof.

In some cases, the set of trigger conditions associated with the first device, the second device, the communications link, or any combination thereof, includes a privacy condition for the first message, a security condition for the first message, a SNR at the first device, or a performance characteristic for transmission of the second message to the base station, or any combination thereof.

The message generator 720 may generate a second message based on selecting to decode the first message or to amplify the first message, where the second message includes at least a portion of the first message.

The transmission component 725 may transmit the second message to the base station. In some examples, the transmission component 725 may transmit one or more second messages to the base station in response to receiving the one or more first messages. The link component 730 may establish a set of communications links with a set of devices including the second device.

The preference module 735 may transmit, to the base station, a preference of the first device to decode the first message or amplify the first message prior to forwarding to the base station. In some cases, the preference of the first device is based on a capability of the first device, available memory at the first device, processing capability of the first device, a thermal condition at the first device, or a power condition at the first device, or any combination thereof.

The indication receiver 740 may receive, from the base station, an indication to decode the first message or amplify the first message, where the selecting is based on the indication.

In some cases, the indication to decode the first message or amplify the first message is based on feedback from the first device, a preference of the first device, or link conditions of one or more communications links associated with the first device, or any combination thereof. In some cases, the indication is specific to the first device.

Figure 8:
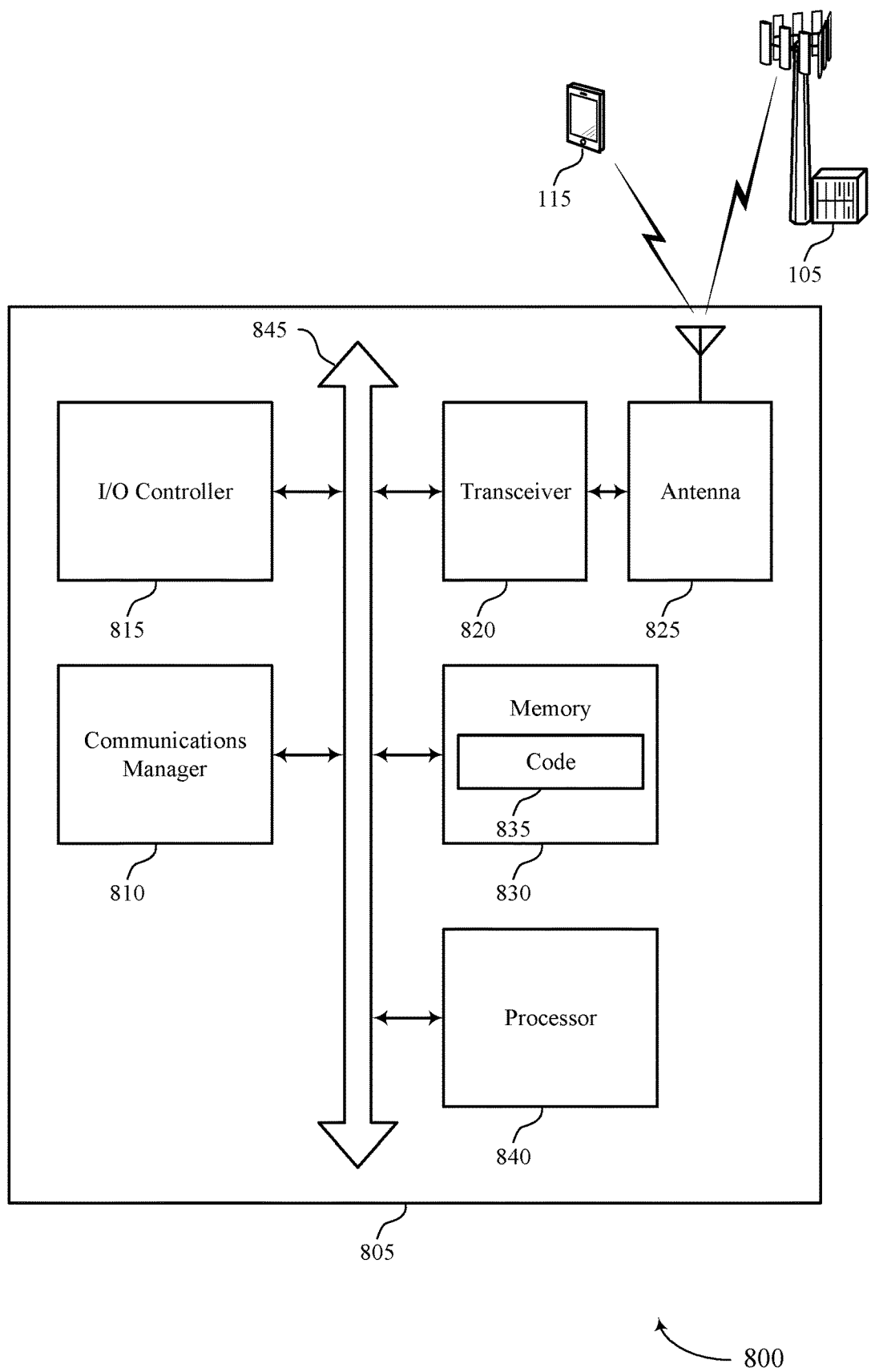
FIG. 8 shows a diagram of a system including a device that supports switching techniques for message forwarding in wireless communications in accordance with aspects of the present disclosure.

FIG. 8 shows a diagram of a system 800 including a device 805 that supports switching techniques for message forwarding in wireless communications in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, via a communications link, a first message from a second device for forwarding by the first device to a base station, select, based on a set of trigger conditions associated with the first device, the second device, the communications link, or any combination thereof, between whether to decode the first message or to amplify the first message prior to forwarding to the base station, generate a second message based on selecting to decode the first message or to amplify the first message, where the second message includes at least a portion of the first message, and transmit the second message to the base station.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input-output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting switching techniques for message forwarding in wireless communications).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
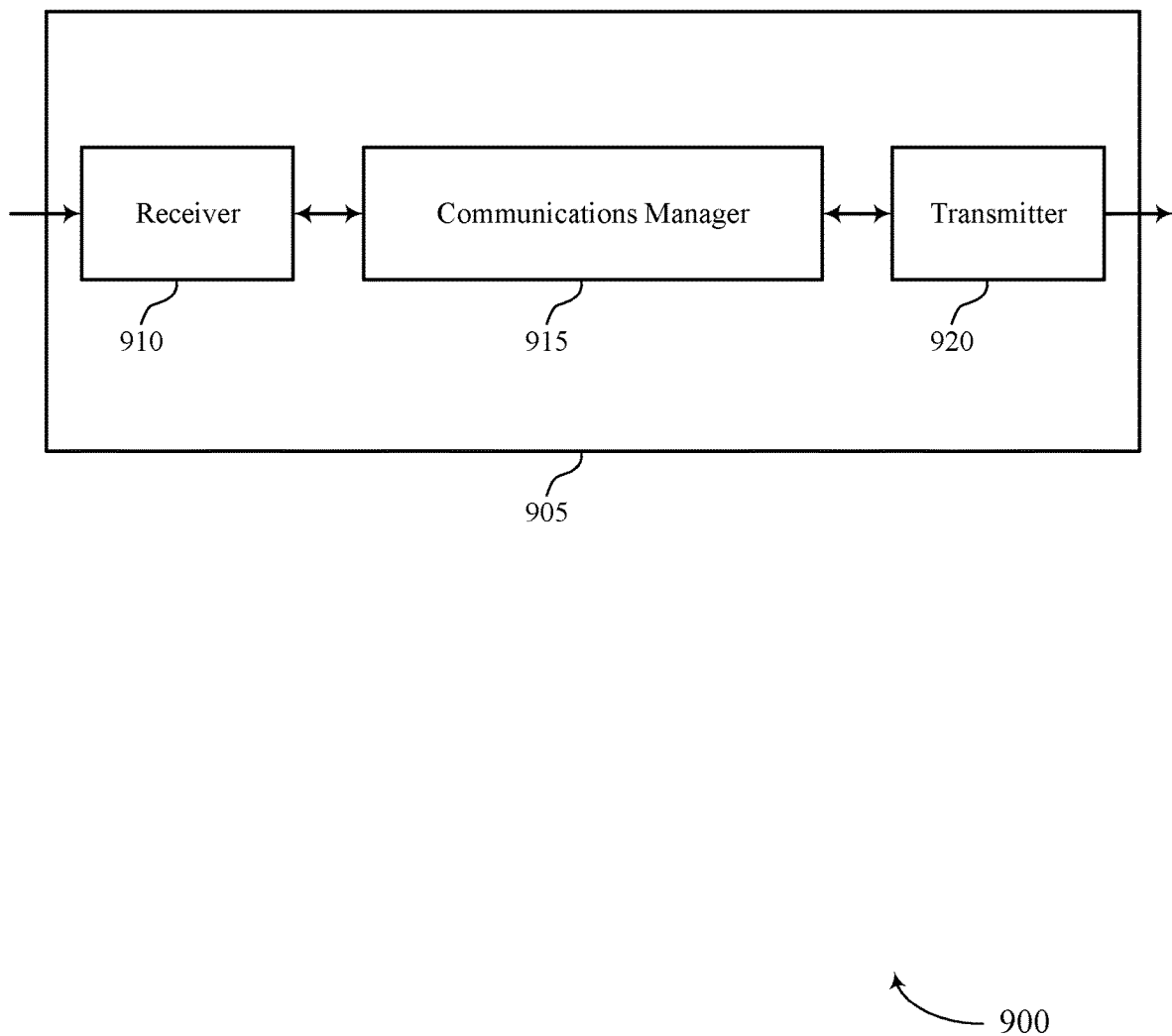
FIGS. 9 and 10 show block diagrams of devices that support switching techniques for message forwarding in wireless communications in accordance with aspects of the present disclosure.

FIG. 9 shows a block diagram 900 of a device 905 that supports switching techniques for message forwarding in wireless communications in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to switching techniques for message forwarding in wireless communications, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may establish a first communications link with a first device that is in communication with a second device via a second communications link, select, based on a set of trigger conditions associated with the first device, the second device, the first communications link, and the second communications link, between whether the first device is to decode a message or to amplify the first message prior to forwarding the first message from the second device to the base station, transmit an indication instructing the first device to decode the first message or amplify the first message prior to forwarding the first message from the second device to the base station based on the selecting, and receive a second message from the first device based on the indication, the second message including at least a portion of the first message. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or any combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
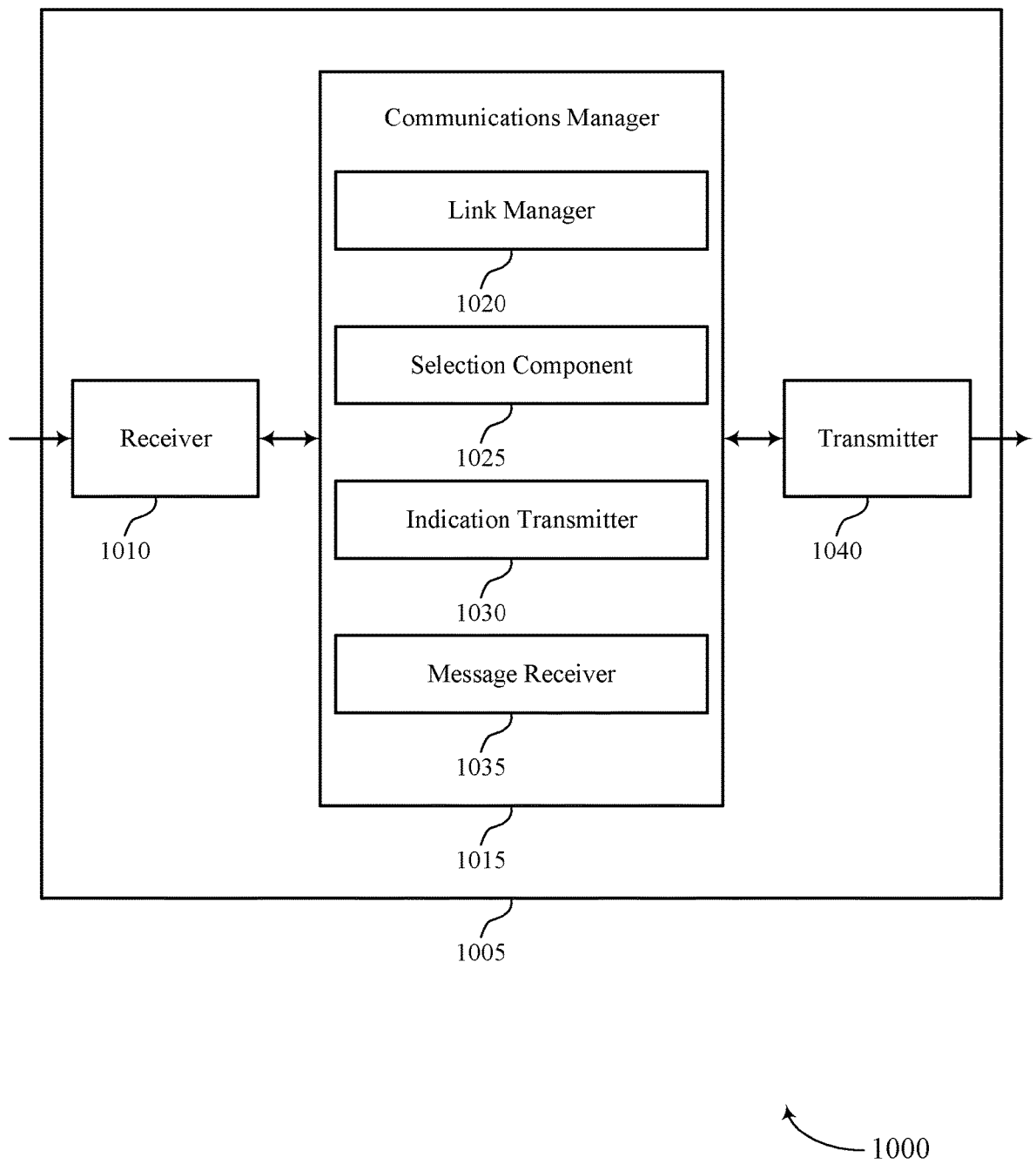

FIG. 10 shows a block diagram 1000 of a device 1005 that supports switching techniques for message forwarding in wireless communications in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to switching techniques for message forwarding in wireless communications, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a link manager 1020, a selection component 1025, an indication transmitter 1030, and a message receiver 1035. The communications manager 1015 may be an example of aspects of the communications manager 1210 described herein.

The link manager 1020 may establish a first communications link with a first device that is in communication with a second device via a second communications link.

The selection component 1025 may select, based on a set of trigger conditions associated with the first device, the second device, the first communications link, and the second communications link, between whether the first device is to decode a message or to amplify the first message prior to forwarding the first message from the second device to the base station.

The indication transmitter 1030 may transmit an indication instructing the first device to decode the first message or amplify the first message prior to forwarding the first message from the second device to the base station based on the selecting.

The message receiver 1035 may receive a second message from the first device based on the indication, the second message including at least a portion of the first message.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
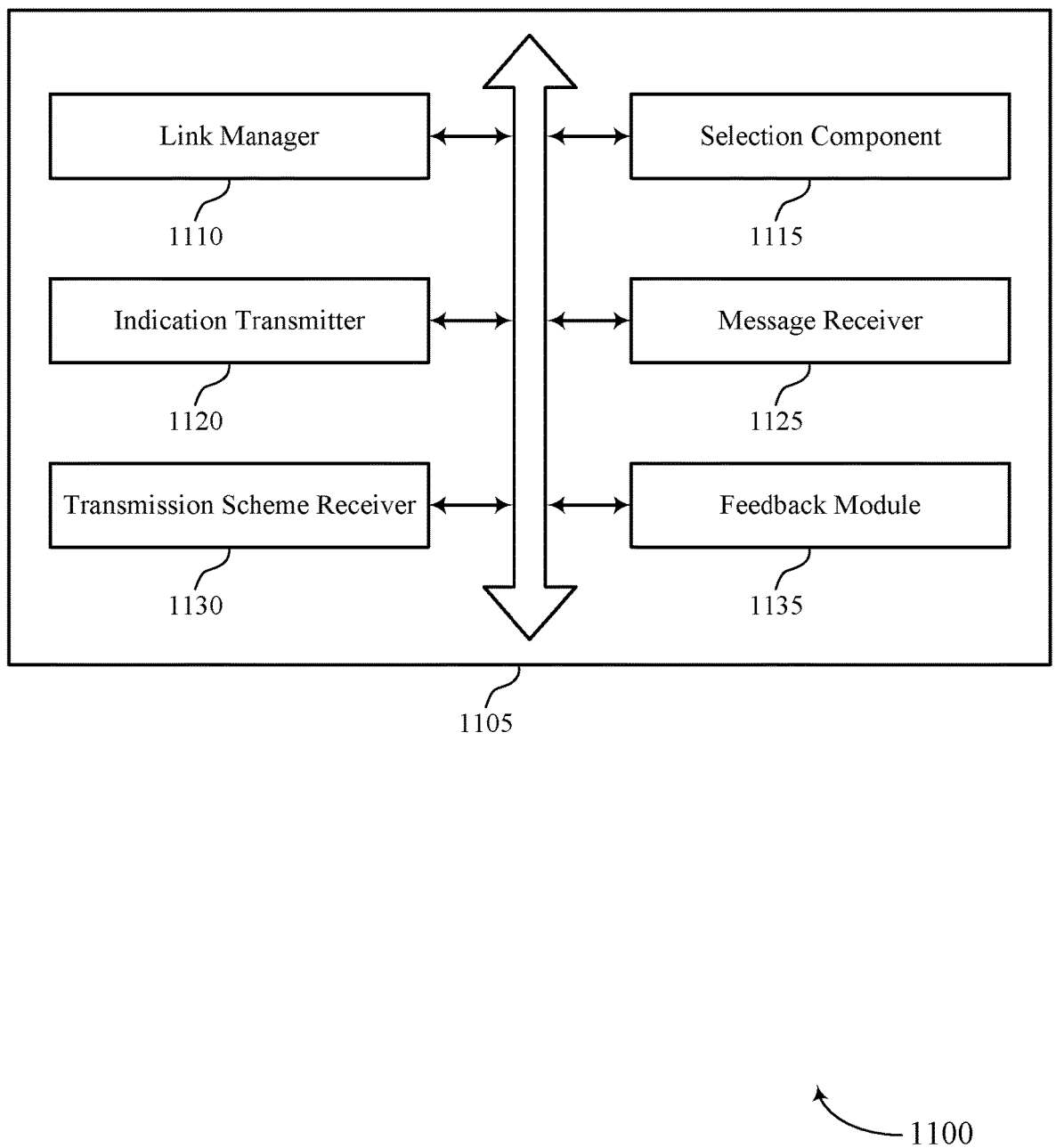
FIG. 11 shows a block diagram of a communications manager that supports switching techniques for message forwarding in wireless communications in accordance with aspects of the present disclosure.

FIG. 11 shows a block diagram 1100 of a communications manager 1105 that supports switching techniques for message forwarding in wireless communications in accordance with aspects of the present disclosure. The communications manager 1105 may be an example of aspects of a communications manager 915, a communications manager 1015, or a communications manager 1210 described herein. The communications manager 1105 may include a link manager 1110, a selection component 1115, an indication transmitter 1120, a message receiver 1125, a transmission scheme receiver 1130, and a feedback module 1135. Each of these modules may communicate, directly or indirectly, with one another (e.g., via one or more buses).

The link manager 1110 may establish a first communications link with a first device that is in communication with a second device via a second communications link.

The selection component 1115 may select, based on a set of trigger conditions associated with the first device, the second device, the first communications link, and the second communications link, between whether the first device is to decode a message or to amplify the first message prior to forwarding the first message from the second device to the base station.

In some examples, the selection component 1115 may select between whether the first device is to decode the first message or to amplify the first message based on the transmission scheme message.

In some examples, the selection component 1115 may select between whether the first device is to decode the first message or amplify the first message based on the feedback message.

In some cases, the set of trigger conditions includes channel conditions between the first device and the second device, channel conditions between the first device and the base station, a power availability at the first device, a thermal condition at the first device, a memory capacity of the first device, or a processing capability of the first device, or any combination thereof.

The indication transmitter 1120 may transmit an indication instructing the first device to decode the first message or amplify the first message prior to forwarding the first message from the second device to the base station based on the selecting.

The message receiver 1125 may receive a second message from the first device based on the indication, the second message including at least a portion of the first message.

The transmission scheme receiver 1130 may receive, via the first communications link, a transmission scheme message from the first device that indicates a preference of the first device for an amplify and forward or a decode and forward transmission scheme.

In some cases, the preference is specific to the second device.

In some cases, the transmission scheme message indicates multiple preferences for multiple devices in communication with the first device via respective communications links.

The feedback module 1135 may receive, via the first communications link, a feedback message from the first device that indicates one or more feedback for communications between the first device and the base station or between the first device and the second device.

Figure 12:
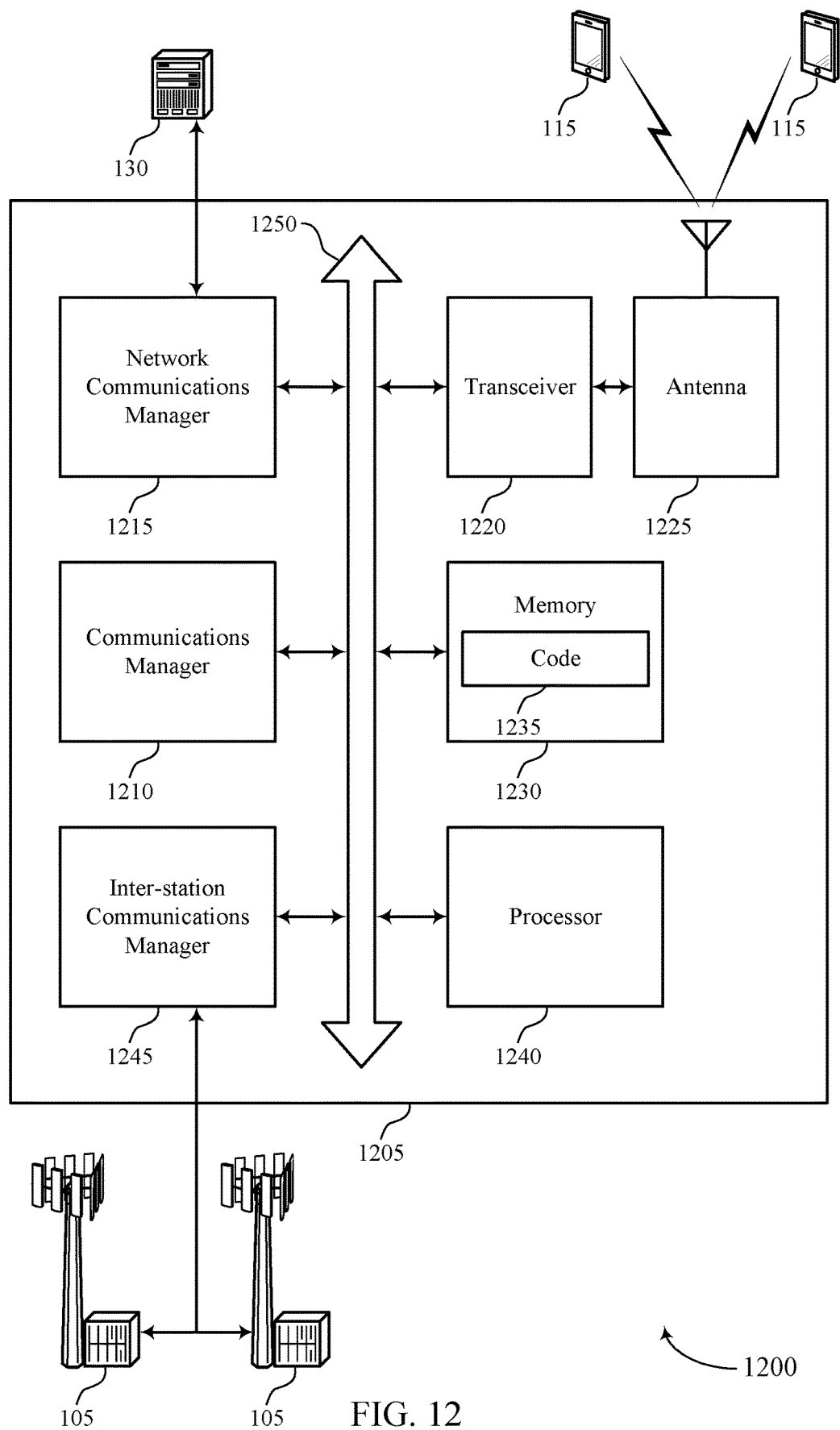
FIG. 12 shows a diagram of a system including a device that supports switching techniques for message forwarding in wireless communications in accordance with aspects of the present disclosure.

FIG. 12 shows a diagram of a system 1200 including a device 1205 that supports switching techniques for message forwarding in wireless communications in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may establish a first communications link with a first device that is in communication with a second device via a second sidelink communications link, select, based on a set of trigger conditions associated with the first device, the second device, the first communications link, and the second communications link, between whether the first device is to decode a message or to amplify the first message prior to forwarding the first message from the second device to the base station, transmit an indication instructing the first device to decode the first message or amplify the first message prior to forwarding the first message from the second device to the base station based on the selecting, and receive a second message from the first device based on the indication, the second message including at least a portion of the first message.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting switching techniques for message forwarding in wireless communications).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
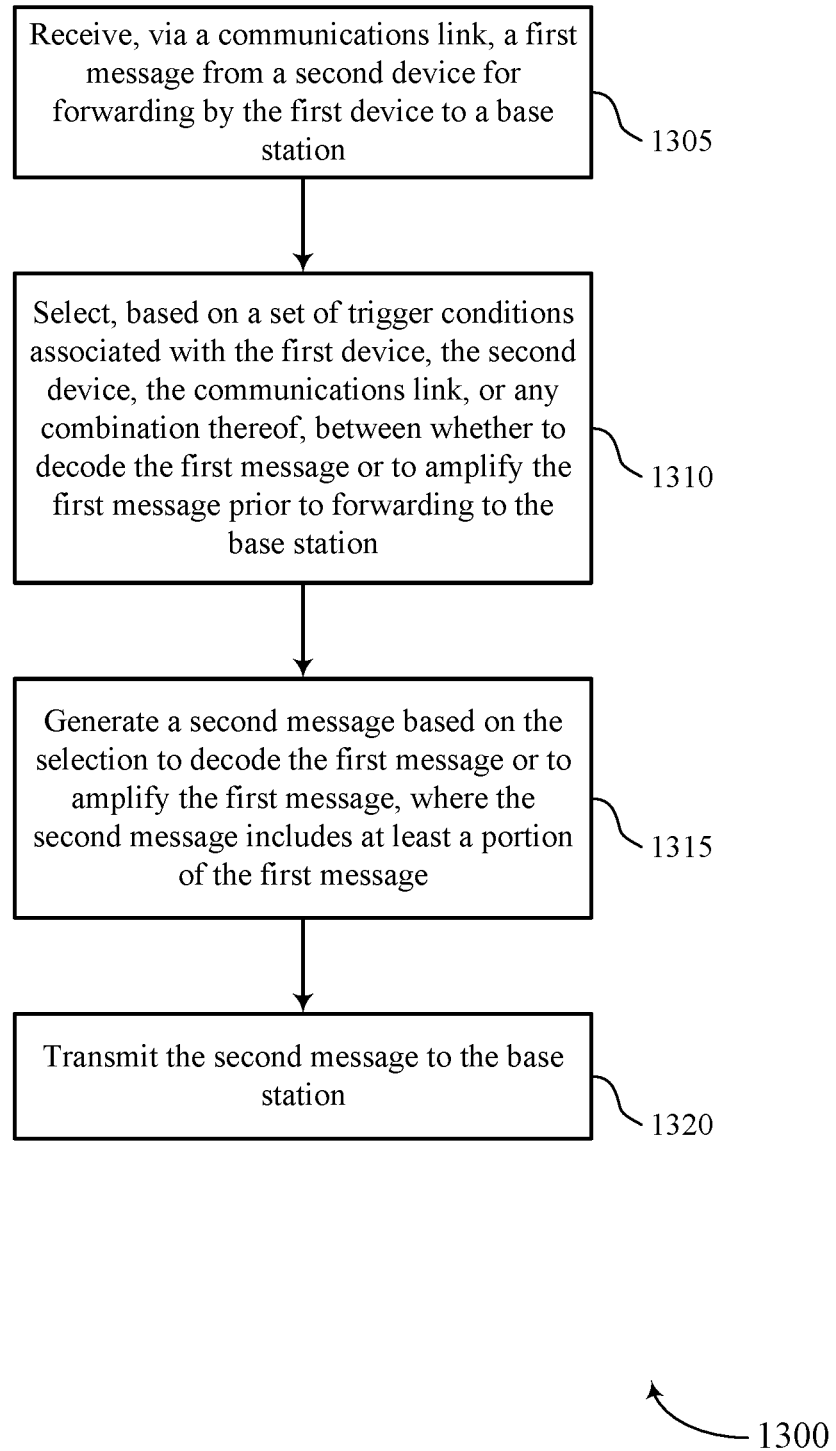
FIGS. 13 through 15 show flowcharts illustrating methods that support switching techniques for message forwarding in wireless communications in accordance with aspects of the present disclosure.

FIG. 13 shows a flowchart illustrating a method 1300 that supports switching techniques for message forwarding in wireless communications in accordance with aspects of the present disclosure. The operations of method 1300 may be implemented by a wireless device such as a UE 115 or its components as described herein. For example, the operations of method 1300 may be performed by a communications manager as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 1305, the device may receive, via a communications link, a first message from a second device for forwarding by the first device to a base station. The operations of 1305 may be performed according to the methods described herein. In some examples, aspects of the operations of 1305 may be performed by a sidelink receiver as described with reference to FIGS. 5 through 8.

At 1310, the device may select, based on a set of trigger conditions associated with the first device, the second device, the communications link, or any combination thereof, between whether to decode the first message or to amplify the first message prior to forwarding to the base station. The operations of 1310 may be performed according to the methods described herein. In some examples, aspects of the operations of 1310 may be performed by a selection manager as described with reference to FIGS. 5 through 8.

At 1315, the device may generate a second message based on selecting to decode the first message or to amplify the first message, where the second message includes at least a portion of the first message. The operations of 1315 may be performed according to the methods described herein. In some examples, aspects of the operations of 1315 may be performed by a message generator as described with reference to FIGS. 5 through 8.

At 1320, the device may transmit the second message to the base station. The operations of 1320 may be performed according to the methods described herein. In some examples, aspects of the operations of 1320 may be performed by a transmission component as described with reference to FIGS. 5 through 8.

Figure 14:
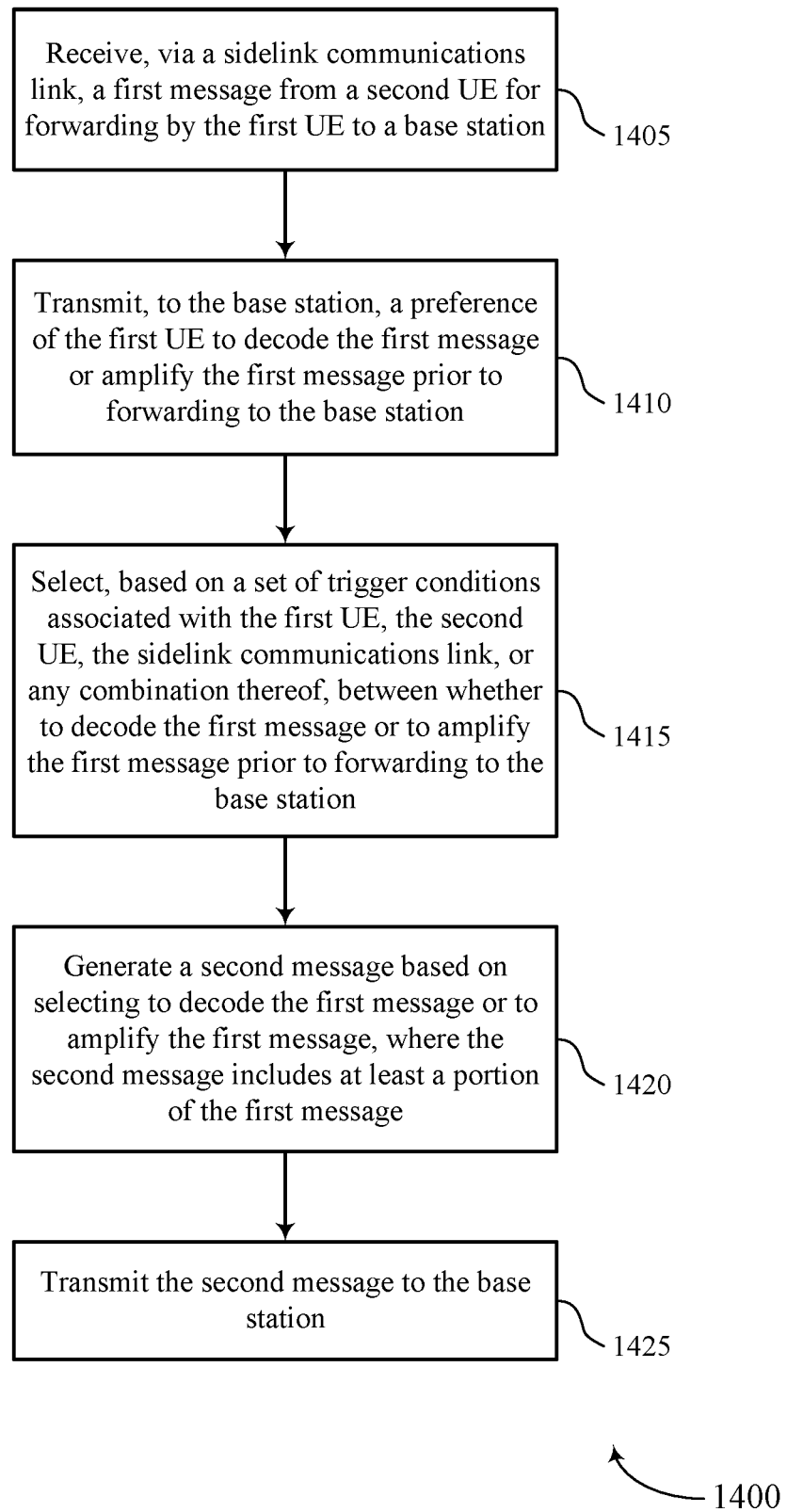

FIG. 14 shows a flowchart illustrating a method 1400 that supports switching techniques for message forwarding in wireless communications in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive, via a sidelink communications link, a first message from a second UE for forwarding by the first UE to a base station. The operations of 1405 may be performed according to the methods described herein. In some examples, aspects of the operations of 1405 may be performed by a sidelink receiver as described with reference to FIGS. 5 through 8.

At 1410, the UE may transmit, to the base station, a preference of the first UE to decode the first message or amplify the first message prior to forwarding to the base station. The operations of 1410 may be performed according to the methods described herein. In some examples, aspects of the operations of 1410 may be performed by a preference module as described with reference to FIGS. 5 through 8.

At 1415, the UE may select, based on a set of trigger conditions associated with the first UE, the second UE, the sidelink communications link, or any combination thereof, between whether to decode the first message or to amplify the first message prior to forwarding to the base station. The operations of 1415 may be performed according to the methods described herein. In some examples, aspects of the operations of 1415 may be performed by a selection manager as described with reference to FIGS. 5 through 8.

At 1420, the UE may generate a second message based on selecting to decode the first message or to amplify the first message, where the second message includes at least a portion of the first message. The operations of 1420 may be performed according to the methods described herein. In some examples, aspects of the operations of 1420 may be performed by a message generator as described with reference to FIGS. 5 through 8.

At 1425, the UE may transmit the second message to the base station. The operations of 1425 may be performed according to the methods described herein. In some examples, aspects of the operations of 1425 may be performed by a transmission component as described with reference to FIGS. 5 through 8.

Figure 15:
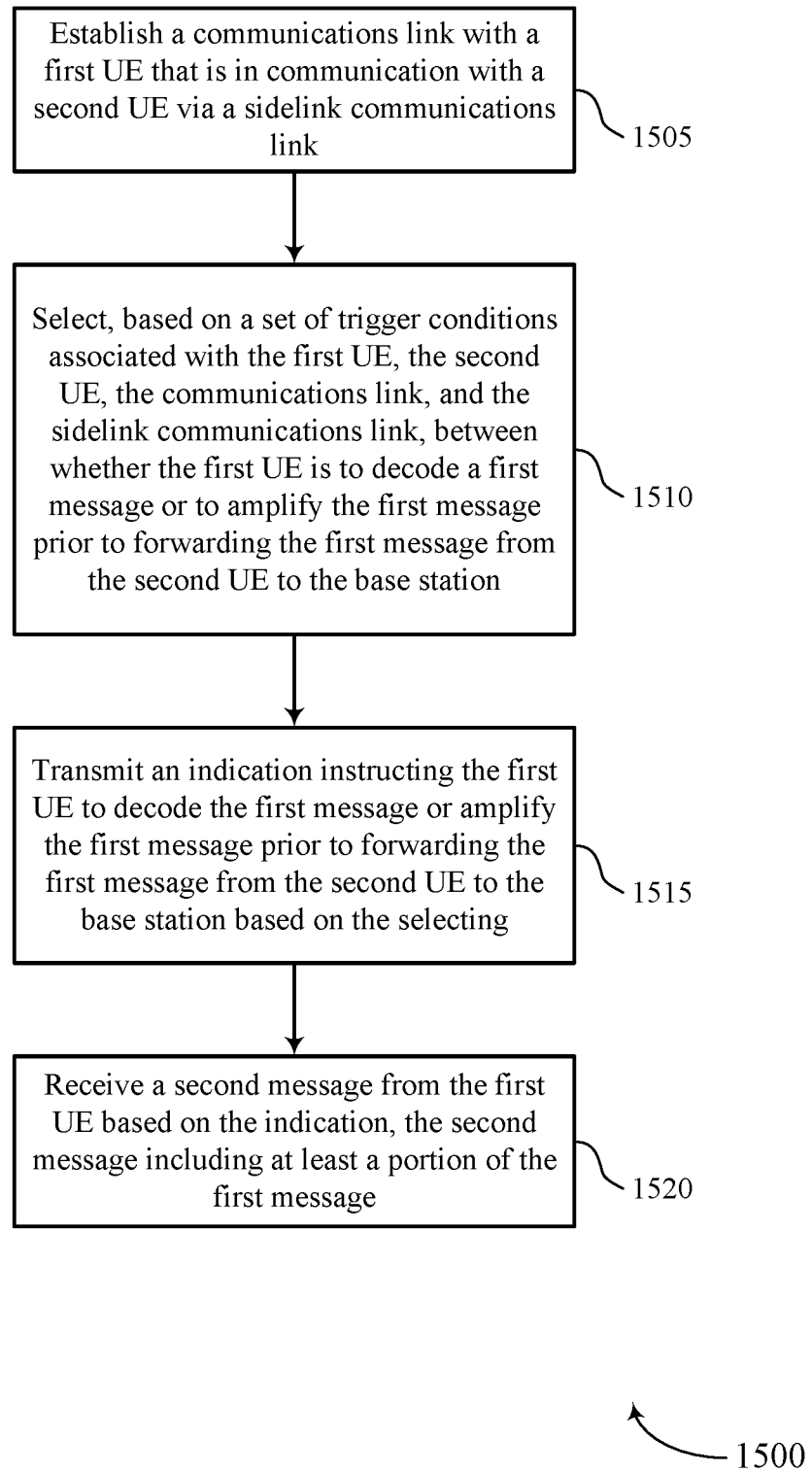

FIG. 15 shows a flowchart illustrating a method 1500 that supports switching techniques for message forwarding in wireless communications in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may establish a communications link with a first UE that is in communication with a second UE via a sidelink communications link. The operations of 1505 may be performed according to the methods described herein. In some examples, aspects of the operations of 1505 may be performed by a link manager as described with reference to FIGS. 9 through 12.

At 1510, the base station may select, based on a set of trigger conditions associated with the first UE, the second UE, the communications link, and the sidelink communications link, between whether the first UE is to decode a message or to amplify the first message prior to forwarding the first message from the second UE to the base station. The operations of 1510 may be performed according to the methods described herein. In some examples, aspects of the operations of 1510 may be performed by a selection component as described with reference to FIGS. 9 through 12.

At 1515, the base station may transmit an indication instructing the first UE to decode the first message or amplify the first message prior to forwarding the first message from the second UE to the base station based on the selecting. The operations of 1515 may be performed according to the methods described herein. In some examples, aspects of the operations of 1515 may be performed by an indication transmitter as described with reference to FIGS. 9 through 12.

At 1520, the base station may receive a second message from the first UE based on the indication, the second message including at least a portion of the first message. The operations of 1520 may be performed according to the methods described herein. In some examples, aspects of the operations of 1520 may be performed by a message receiver as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a first device, comprising: receiving, via a communications link, a first message from a second device for forwarding by the first device to a base station; selecting, based at least in part on a set of trigger conditions associated with the first device, the second device, the communications link, or any combination thereof, between whether to decode the first message or to amplify the first message prior to forwarding to the base station; generating a second message based at least in part on selecting to decode the first message or to amplify the first message, wherein the second message includes at least a portion of the first message; and transmitting the second message to the base station.

Aspect 2: The method of aspect 1, wherein the set of trigger conditions associated with the first device comprises a power availability at the first device, a thermal condition at the first device, a memory capacity of the first device, or a processing capability of the first device, or any combination thereof.

Aspect 3: The method of any of aspects 1 through 2, wherein the set of trigger conditions associated with the first device, the second device, the communications link, or any combination thereof, comprises a beamforming parameter, the beamforming parameter comprising a first beamwidth of a first beam used for transmission of the first message from the second device to the first device, a second beamwidth of a second beam used for transmission of the second message from the first device to the base station, an array gain at the first device, or a Doppler effect of one or more of the first beam or the second beam, or any combination thereof.

Aspect 4: The method of any of aspects 1 through 3, wherein the set of trigger conditions associated with the first device, the second device, the communications link, or any combination thereof, comprises a privacy condition for the first message, a security condition for the first message, an SNR at the first device, or a performance characteristic for transmission of the second message to the base station, or any combination thereof.

Aspect 5: The method of any of aspects 1 through 4, further comprising: establishing a plurality of communications links with a plurality of devices including the second device; receiving one or more first messages via the plurality of communications links; and transmitting one or more second messages to the base station in response to receiving the one or more first messages.

Aspect 6: The method of any of aspects 1 through 5, further comprising: selecting between whether to decode the first message or to amplify the first message is based at least in part on one or more static conditions at the first device, the second device, or the base station, or any combination thereof.

Aspect 7: The method of any of aspects 1 through 6, further comprising: transmitting, to the base station, a preference of the first device to decode the first message or amplify the first message prior to forwarding to the base station.

Aspect 8: The method of aspect 7, wherein the preference of the first device is based at least in part on a capability of the first device, available memory at the first device, processing capability of the first device, a thermal condition at the first device, or a power condition at the first device, or any combination thereof.

Aspect 9: The method of any of aspects 1 through 8, further comprising: receiving, from the base station, an indication to decode the first message or amplify the first message, wherein the selecting is based at least in part on the indication.

Aspect 10: The method of aspect 9, wherein the indication to decode the first message or amplify the first message is based at least in part on feedback from the first device, a preference of the first device, or link conditions of one or more communications links associated with the first device, or any combination thereof.

Aspect 11: The method of any of aspects 9 through 10, wherein the indication is specific to the first device.

Aspect 12: A method for wireless communications at a base station, comprising: establishing a first communications link with a first device that is in communication with a second device via a second communications link; selecting, based at least in part on a set of trigger conditions associated with the first device, the second device, the first communications link, and the second communications link, between whether the first device is to decode a first message or to amplify the first message prior to forwarding the first message from the second device to the base station; transmitting an indication instructing the first device to decode the first message or amplify the first message prior to forwarding the first message from the second device to the base station based at least in part on the selecting; and receiving a second message from the first device based at least in part on the indication, the second message including at least a portion of the first message.

Aspect 13: The method of aspect 12, further comprising: receiving, via the first communications link, a transmission scheme message from the first device that indicates a preference of the first device for an amplify and forward or a decode and forward transmission scheme; and selecting between whether the first device is to decode the first message or to amplify the first message based at least in part on the transmission scheme message.

Aspect 14: The method of aspect 13, wherein the preference is specific to the second device.

Aspect 15: The method of any of aspects 13 through 14, wherein the transmission scheme message indicates multiple preferences for multiple devices in communication with the first device via respective communications links.

Aspect 16: The method of any of aspects 12 through 15, further comprising: receiving, via the first communications link, a feedback message from the first device that indicates one or more feedback for communications between the first device and the base station or between the first device and the second device; and selecting between whether the first device is to decode the first message or amplify the first message based at least in part on the feedback message.

Aspect 17: The method of any of aspects 12 through 16, wherein the set of trigger conditions comprises first channel conditions between the first device and the second device, second channel conditions between the first device and the base station, a power availability at the first device, a thermal condition at the first device, a memory capacity of the first device, or a processing capability of the first device, or any combination thereof.

Aspect 18: An apparatus for wireless communications at a first device, comprising a processor; memory coupled with the processor; and instructions stored in the memory and executable by the processor to cause the apparatus to perform a method of any of aspects 1 through 11.

Aspect 19: An apparatus for wireless communications at a first device, comprising at least one means for performing a method of any of aspects 1 through 11.

Aspect 20: A non-transitory computer-readable medium storing code for wireless communications at a first device, the code comprising instructions executable by a processor to perform a method of any of aspects 1 through 11.

Aspect 21: An apparatus for wireless communications at a base station, comprising a processor; memory coupled with the processor; and instructions stored in the memory and executable by the processor to cause the apparatus to perform a method of any of aspects 12 through 17.

Aspect 22: An apparatus for wireless communications at a base station, comprising at least one means for performing a method of any of aspects 12 through 17.

Aspect 23: A non-transitory computer-readable medium storing code for wireless communications at a base station, the code comprising instructions executable by a processor to perform a method of any of aspects 12 through 17.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first device, comprising:
    receiving, via a communications link, a first message from a second device for forwarding by the first device to a network device;
    selecting, at the first device and based at least in part on a set of trigger conditions associated with the first device, the second device, the communications link, or any combination thereof, between whether to decode the first message or to amplify the first message prior to forwarding to the network device, the set of trigger conditions comprising at least a beamforming parameter;
    generating a second message based at least in part on selecting to decode the first message or to amplify the first message, wherein the second message includes at least a portion of the first message; and
    transmitting the second message to the network device.

2. The method of claim 1, wherein the set of trigger conditions associated with the first device comprises a power availability at the first device, a thermal condition at the first device, a memory capacity of the first device, or a processing capability of the first device, or any combination thereof.

3. The method of claim 1, wherein the beamforming parameter comprises a first beamwidth of a first beam used for transmission of the first message from the second device to the first device, a second beamwidth of a second beam used for the transmission of the second message from the first device to the network device, an array gain at the first device, or a Doppler effect of one or more of the first beam or the second beam, or any combination thereof.

4. The method of claim 1, wherein the set of trigger conditions associated with the first device, the second device, the communications link, or any combination thereof, comprises a privacy condition for the first message, a security condition for the first message, a signal-to-noise ratio (SNR) at the first device, or a performance characteristic for transmission of the second message to the network device, or any combination thereof.

5. The method of claim 1, further comprising:
    establishing a plurality of communications links with a plurality of devices including the second device;
    receiving one or more first messages via the plurality of communications links; and transmitting one or more second messages to the network device in response to receiving the one or more first messages.

6. The method of claim 1, further comprising:
selecting between whether to decode the first message or to amplify the first message is based at least in part on one or more static conditions at the first device, the second device, or the network device, or any combination thereof.

7. The method of claim 1, further comprising:
transmitting, to the network device, a preference of the first device to decode the first message or amplify the first message prior to forwarding to the network device.

8. The method of claim 7, wherein the preference of the first device is based at least in part on a capability of the first device, available memory at the first device, processing capability of the first device, a thermal condition at the first device, or a power condition at the first device, or any combination thereof.

9. The method of claim 1, further comprising:
receiving, from the network device, an indication to decode the first message or amplify the first message, wherein the selecting is based at least in part on the indication.

10. The method of claim 9, wherein the indication to decode the first message or amplify the first message is based at least in part on feedback from the first device, a preference of the first device, or link conditions of one or more communications links associated with the first device, or any combination thereof.

11. The method of claim 9, wherein the indication is specific to the first device.

12. A method for wireless communications at a network device, comprising:
establishing a first communications link with a first device that is in communication with a second device via a second communications link;
receiving, from the first device, an indication of whether the first device is to amplify a first message or decode the first message prior to forwarding the first message from the second device to the network device, the indication being based at least in part on a beamforming parameter; and
receiving a second message from the first device based at least in part on the indication of whether the first device is to amplify the first message or decode the first message prior to forwarding the first message, the second message including at least a portion of the first message.

13. The method of claim 12, further comprising:
receiving, via the first communications link, a transmission scheme message from the first device that indicates a preference of the first device for an amplify and forward or a decode and forward transmission scheme; and
selecting between whether the first device is to decode the first message or to amplify the first message based at least in part on the transmission scheme message and a set of trigger conditions associated with the first device, the second device, the first communications link and the second communications link.

14. The method of claim 13, wherein the preference is specific to the second device.

15. The method of claim 13, wherein the transmission scheme message indicates multiple preferences for multiple devices in communication with the first device via respective communications links.

16. The method of claim 12, further comprising:
receiving, via the first communications link, a feedback message from the first device that indicates one or more feedback for communications between the first device and the network device or between the first device and the second device; and
selecting between whether the first device is to decode the first message or amplify the first message based at least in part on the feedback message.

17. The method of claim 13, wherein the set of trigger conditions associated with the first device, the second device, the second communications link, or any combination thereof, comprises first channel conditions between the first device and the second device, second channel conditions between the first device and the network device, a power availability at the first device, a thermal condition at the first device, a memory capacity of the first device, or a processing capability of the first device, or any combination thereof.

18. An apparatus for wireless communications at a first device, comprising:
a processor,
memory coupled with the processor; and
instructions stored in the memory and executable by the processor to cause the apparatus to:
receive, via a communications link, a first message from a second device for forwarding by the first device to a network device;
select, based at least in part on a set of trigger conditions associated with the first device, the second device, the communications link, or any combination thereof, between whether to decode the first message or to amplify the first message prior to forwarding to the network device, the set of trigger conditions comprising at least a beamforming parameter;
generate a second message based at least in part on selecting to decode the first message or to amplify the first message, wherein the second message includes at least a portion of the first message; and
transmit the second message to the network device.

19. The apparatus of claim 18, wherein the set of trigger conditions associated with the first device comprises a power availability at the first device, a thermal condition at the first device, a memory capacity of the first device, or a processing capability of the first device, or any combination thereof.

20. The apparatus of claim 18, wherein the beamforming parameter comprises a first beamwidth of a first beam used for transmission of the first message from the second device to the first device, a second beamwidth of a second beam used for the transmission of the second message from the first device to the network device, an array gain at the first device, or a Doppler effect of one or more of the first beam or the second beam, or any combination thereof.

21. The apparatus of claim 18, wherein the set of trigger conditions associated with the first device, the second device, the communications link, or any combination thereof, comprises a privacy condition for the first message, a security condition for the first message, a signal-to-noise ratio (SNR) at the first device, or a performance characteristic for transmission of the second message to the network device, or any combination thereof.

22. The apparatus of claim 18, wherein the instructions are further executable by the processor to cause the apparatus to:
establish a plurality of communications links with a plurality of devices including the second device;

receive one or more first messages via the plurality of communications links; and transmit one or more second messages to the network device in response to receiving the one or more first messages.

23. The apparatus of claim 18, wherein the instructions are further executable by the processor to cause the apparatus to:

select between whether to decode the first message or to amplify the first message is based at least in part on one or more static conditions at the first device, the second device, or the network device, or any combination thereof.

24. The apparatus of claim 18, wherein the instructions are further executable by the processor to cause the apparatus to:

transmit, to the network device, a preference of the first device to decode the first message or amplify the first message prior to forwarding to the network device.

25. The apparatus of claim 18, wherein the instructions are further executable by the processor to cause the apparatus to:

receive, from the network device, an indication to decode the first message or amplify the first message, wherein the selecting is based at least in part on the indication.

26. An apparatus for wireless communications at a network device, comprising:

a processor, memory coupled with the processor; and instructions stored in the memory and executable by the processor to cause the apparatus to:

establish a first communications link with a first device that is in communication with a second device via a second communications link;

receive, from the first device, an indication of whether the first device is to amplify a first message or decode the first message prior to forwarding the first message from the second device to the network device, the indication being based at least in part on a beamforming parameter; and receive a second message from the first device based at least in part on the indication of whether the first device is to amplify the first message or decode the first message prior to forwarding the first message, the second message including at least a portion of the first message.

27. The apparatus of claim 26, wherein the instructions are further executable by the processor to cause the apparatus to:

receive, via the first communications link, a transmission scheme message from the first device that indicates a preference of the first device for an amplify and forward or a decode and forward transmission scheme; and select between whether the first device is to decode the first message or to amplify the first message based at least in part on the transmission scheme message and a set of trigger conditions associated with the first device, the second device, the first communications link and the second communications link.

28. The apparatus of claim 27, wherein the preference is specific to the second device.

29. The apparatus of claim 27, wherein the transmission scheme message indicates multiple preferences for multiple devices in communication with the first device via respective communications links.

30. The apparatus of claim 26, wherein the instructions are further executable by the processor to cause the apparatus to:

receive, via the first communications link, a feedback message from the first device that indicates one or more feedback for communications between the first device and the network device or between the first device and the second device; and select between whether the first device is to decode the first message or amplify the first message based at least in part on the feedback message.

* * * * *